US009366866B2

(12) United States Patent
Sugihara

(10) Patent No.: US 9,366,866 B2
(45) Date of Patent: Jun. 14, 2016

(54) IMAGE DISPLAY APPARATUS

(71) Applicant: OLYMPUS CORPORATION, Tokyo (JP)

(72) Inventor: Ryohei Sugihara, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 61 days.

(21) Appl. No.: 14/227,451

(22) Filed: Mar. 27, 2014

(65) Prior Publication Data
US 2014/0211321 A1 Jul. 31, 2014

Related U.S. Application Data

(63) Continuation-in-part of application No. PCT/JP2013/002141, filed on Mar. 28, 2013.

(30) Foreign Application Priority Data

Apr. 5, 2012 (JP) ................................ 2012-086254

(51) Int. Cl.
G02B 27/14 (2006.01)
G09G 5/00 (2006.01)
(Continued)

(52) U.S. Cl.
CPC ........ *G02B 27/0172* (2013.01); *G02B 27/0101* (2013.01); *G02B 6/0035* (2013.01); *G02B 17/086* (2013.01); *G02B 27/01* (2013.01); *G02B 2027/015* (2013.01);
(Continued)

(58) Field of Classification Search
CPC ............... G02B 27/01; G02B 27/0101; G02B 27/0172; G02B 6/0035; G02B 17/04; G02B 17/086; G02B 2027/0118; G02B 2027/0123; G02B 2027/015; G02B 2027/0178; G02B 2027/0198; G09G 5/00; G03B 21/00; H04N 9/31; H04N 9/3197
USPC ......... 359/626–628, 630, 631, 638, 707, 720, 359/721; 345/7–9; 353/7, 20, 30; 348/E5.14, E9.027
See application file for complete search history.

(56) References Cited

U.S. PATENT DOCUMENTS 4,427,977 A * 1/1984 Carollo et al. ................... 345/22
6,094,181 A * 7/2000 Hildebrand et al. ............... 345/8
(Continued)

FOREIGN PATENT DOCUMENTS

| JP | 2000-249968 A | 9/2000 |
|---|---|---|
| JP | 2002-118799 A | 4/2002 |
| JP | 2007-79298 A | 3/2007 |
| JP | 2010-72151 A | 4/2010 |
| JP | 2012-27351 A | 2/2012 |

OTHER PUBLICATIONS

Notification of Reasons for Refusal dated Dec. 2, 2014 received from the Japanese Patent Office from related Application No. 2013-541135, together with an English-language translation.

*Primary Examiner* — Loha Ben
(74) *Attorney, Agent, or Firm* — Scully, Scott, Murphy & Presser, P.C.

(57) ABSTRACT

An image display apparatus includes a light source, a display device, an at least one illumination prism, and an at least one eyepiece optic. The light source emits illumination light. The display device modulates the illumination light and emits the modulated light as image light. The illumination light emitted from the light source is incident on the illumination prism. The at least one eyepiece optic transmits the image light emitted from the display device.

36 Claims, 22 Drawing Sheets

(51) Int. Cl.
*G02B 27/01* (2006.01)
*F21V 8/00* (2006.01)
*G02B 17/08* (2006.01)
*G03B 21/00* (2006.01)
*G02C 11/00* (2006.01)

(52) U.S. Cl.
CPC ............ *G02B 2027/0118* (2013.01); *G02B 2027/0178* (2013.01); *G02C 11/10* (2013.01); *G03B 21/00* (2013.01); *G09G 5/00* (2013.01)

(56) References Cited

U.S. PATENT DOCUMENTS

| | | | |
|---|---|---|---|
| 6,542,307 B2 * | 4/2003 | Gleckman et al. | 359/638 |
| 6,646,811 B2 * | 11/2003 | Inoguchi | 359/631 |
| 6,791,760 B2 * | 9/2004 | Janeczko et al. | 359/630 |
| 7,019,909 B2 * | 3/2006 | Yamazaki et al. | 359/633 |
| 7,346,261 B2 * | 3/2008 | Yamamoto et al. | 385/146 |

* cited by examiner

IMAGE DISPLAY APPARATUS

The present application is a Continuation in Part of PCT/JP2013/002141, filed on Mar. 28, 2013, which in turn, claims priority to Japanese Patent Application No. 2012-086254, filed on Apr. 5, 2012, the entire disclosures of which are incorporated herein by reference.

BACKGROUND

The present disclosure generally relates to an image display apparatus using illumination light with high efficiency.

An image display apparatus is known which is mounted on a user's head and which allows the user to observe a virtual image obtained by enlarging an image of a small-size display device through the use of an eyepiece optical system. Since the image display apparatus is mounted on a head, it is desired to reduce the size of the image display apparatus.

In such an image display apparatus, an image is formed by modulating illumination light emitted from a light source through the use of a display device.

Such an image display apparatus requires use of illumination light emitted from the light source with high efficiency. Therefore, a decrease in size of the image display apparatus or efficient use of illumination light has been proposed by combining mirrors to construct an at least one illumination optic and arranging an illumination mirror so that a light source and an optical pupil should be conjugate with each other (Japanese Patent Application Laid-Open No. 2010-72151).

SUMMARY

According to an aspect of the present disclosure, there is provided an image display apparatus including: a light source that emits illumination light; a display device that modulates the illumination light and emits the modulated light as image light; at least one at least one illumination optic that transmits the illumination light emitted from the light source to the display device and that has an optical surface having positive optical power; and at least one eyepiece optic that transmits the image light from the display device and that has an eyepiece surface transmitting the transmitted image light, wherein the at least one illumination optic focuses an image of the light source on one of the eyepiece surface and the vicinity of the eyepiece surface in a first plane, the first plane comprising a central ray of the image light emitted from the display device.

According to another aspect of the present disclosure, there is provided an image display apparatus including: a light source that emits illumination light; a display device that modulates the illumination light and transmits the modulated light as image light; at least one illumination optic that transmits the illumination light emitted from the light source to the display device and that has positive optical power; and at least one eyepiece optic that transmits the image light from the display device and that has an eyepiece surface transmitting the transmitted image light to outside of the at least one eyepiece optic, wherein the at least one illumination optic: focuses the transmitted image light on the outside of the at least one eyepiece optic in a first plane, the first plane comprising a central ray of the image light transmitted from the display device, and focuses the image light between the display device and the eyepiece surface in a second plane, the second plane different from the first plane and the second plane comprising the central ray.

According to still another aspect of the present disclosure, there is provided an image display apparatus including: a first light source that emits illumination light; a display device that modulates the illumination light and transmits the modulated light as image light; at least one illumination optic that transmits the illumination light emitted from the first light source to the display device and that has positive optical power; and at least one eyepiece optic that transmits the image light from the display device and that has an eyepiece surface transmitting the transmitted image light, wherein a sagittal focal position which is a focal position of the at least one illumination optic in a sagittal plane with the light source as an object point is located closer to the display device than a meridional focal position which is a focal position in a meridional plane.

DESCRIPTION OF THE PREFERRED EMBODIMENTS

According to some aspects of the present disclosure, it is possible to reduce loss of illumination light even in a at least one eyepiece optic by adjusting a focal position of an image of a light source by the use of an at least one illumination optic. At least one illumination optic can include one or more eccentric optics. An eccentric optic includes at least one surface of the optic included in the eccentric optic is out of the optical axis of other surface of the optic. Therefore, it is possible to provide an image display apparatus which can use illumination light with high efficiency and in which the at least one eyepiece optic is reduced in size.

Figure 1:
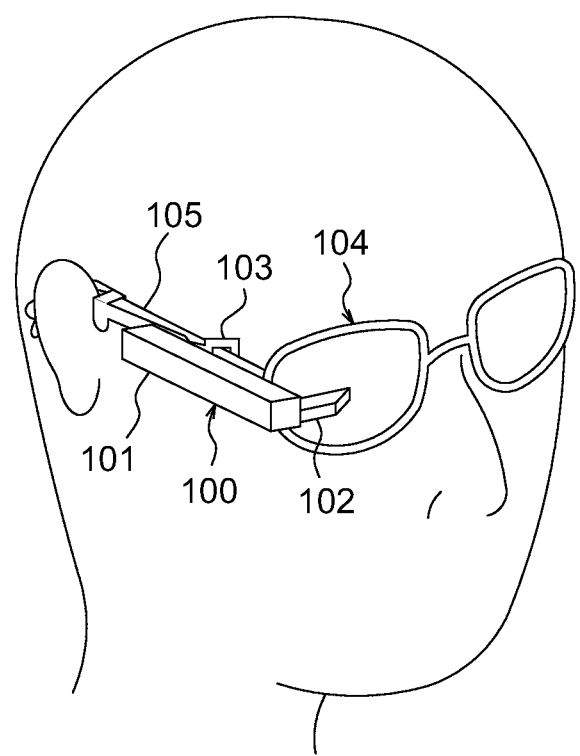
FIG. 1 is a perspective view illustrating an appearance of an observer wearing eyeglasses, which are mounted with an image display apparatus according to a first embodiment of the present disclosure, on the observer's head.

Hereinafter, image display apparatuses according to embodiments of the present disclosure will be described with reference to the accompanying drawings. FIG. 1 is a perspective view illustrating an appearance of an observer wearing eyeglasses, which are mounted with an image display apparatus according to a first embodiment of the present disclosure, on the observer's head.

An image display apparatus 100 includes an apparatus body 101 and an at least one eyepiece optic 102. The apparatus body 101 can be mounted on a temple 105 of eyeglasses 104 using an engagement member 103 such as a hook. The at least one eyepiece optic 102 is formed to extend from the apparatus body 101 to the front of an observer's eye in a state where the observer wears the eyeglasses 104. The apparatus body 101 forms an image to be observed and emits the formed image as image light. The at least one eyepiece optic 102 guides the image light from the apparatus body 101 to the observer's eye in a state where the observer wears the eyeglasses 104 having the apparatus body 101 mounted thereon.

Figure 2:
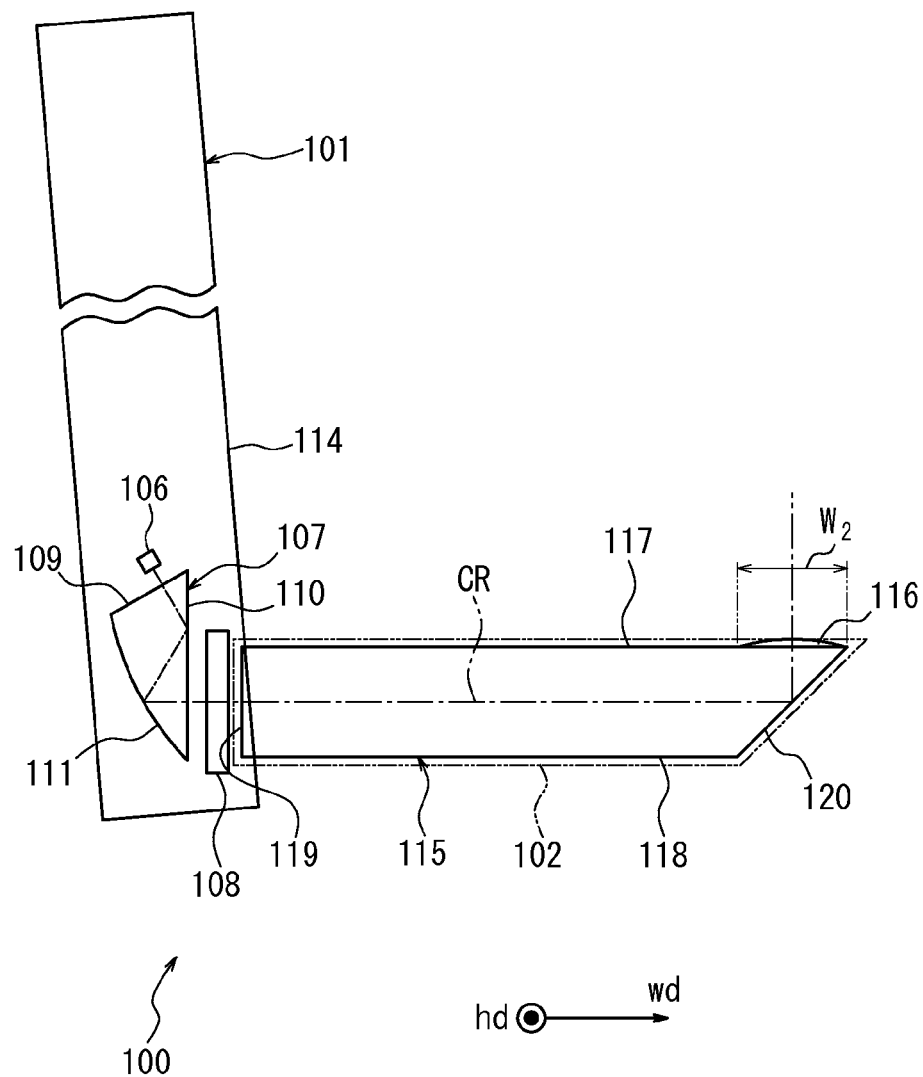
FIG. 2 is a cross-sectional view of the image display apparatus according to the first embodiment.

As shown in FIG. 2, the apparatus body 101 is provided with a light source 106, an illumination prism 107, a display device 108, and the like. The light source 106 is, for example, an LED and emits illumination light. The illumination prism 107 includes an incidence surface 109, an emission surface 110, and a reflecting surface 111. The illumination prism 107 is disposed so that the illumination light emitted from the light source 106 is incident on the incidence surface 109. The at least one eyepiece optic 102, such as eyepiece optic 102 in this embodiment, and the eyepiece optic in other embodiments, including eyepiece optic 2102, can be any suitable element that can transmit image light from the display device, including but not limited to one or more illumination prisms and one or more mirrors. Each of the surfaces of each of the at least one eyepiece optics can be powered or unpowered, as desired. The at least one illumination optic, such as illumination prism 107 in this embodiment, and the illumination prism in other embodiments, including illumination prisms 2107, 21070, 21071, can be any suitable element that can transmit illumination light from the light source to the display device and that has a positive optical power, including but not limited to one or more illumination prisms and one or more mirrors. Each of the surfaces of each of the at least one illumination optics can be powered or unpowered, as desired. The light source, such as light source 106 in this embodiment, including but not limited to one or more light sources, as desired.

Figure 3:
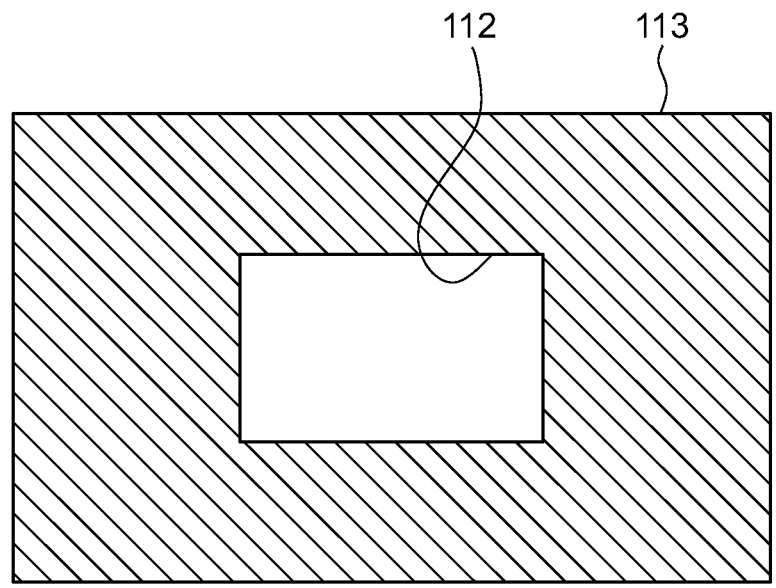
FIG. 3 is a front view of a mask.

The incidence surface 109 of the illumination prism 107 is preferably covered with a mask 113 on which a rectangular aperture 112 is formed as shown in FIG. 3. A light flux of illumination light passing through the aperture 112 is incident on the incidence surface 109 (as shown in FIG. 2).

The illumination prism 107 is formed and disposed so that the emission surface 110 reflects the illumination light incident on the illumination prism 107 to the reflecting surface 111, the reflecting surface 111 reflects the reflected illumination light so as to be incident on and perpendicular or substantially perpendicular to the emission surface 110, and the emission surface 110 transmits the illumination light to be perpendicular or substantially perpendicular thereto. The emission surface 110 may reflect totally or partly, as desired. The shape of the reflecting surface 111 of the illumination prism will be described later in detail.

In this way, by using the reflecting surface 111 having optical power as an element of at least one illumination optic that is rotationally asymmetric about the optical axis from the light source 106 to the emission surface 110 as described later, it is possible to direct an optical path compactly and to use a small-size illumination prism.

Figure 4:
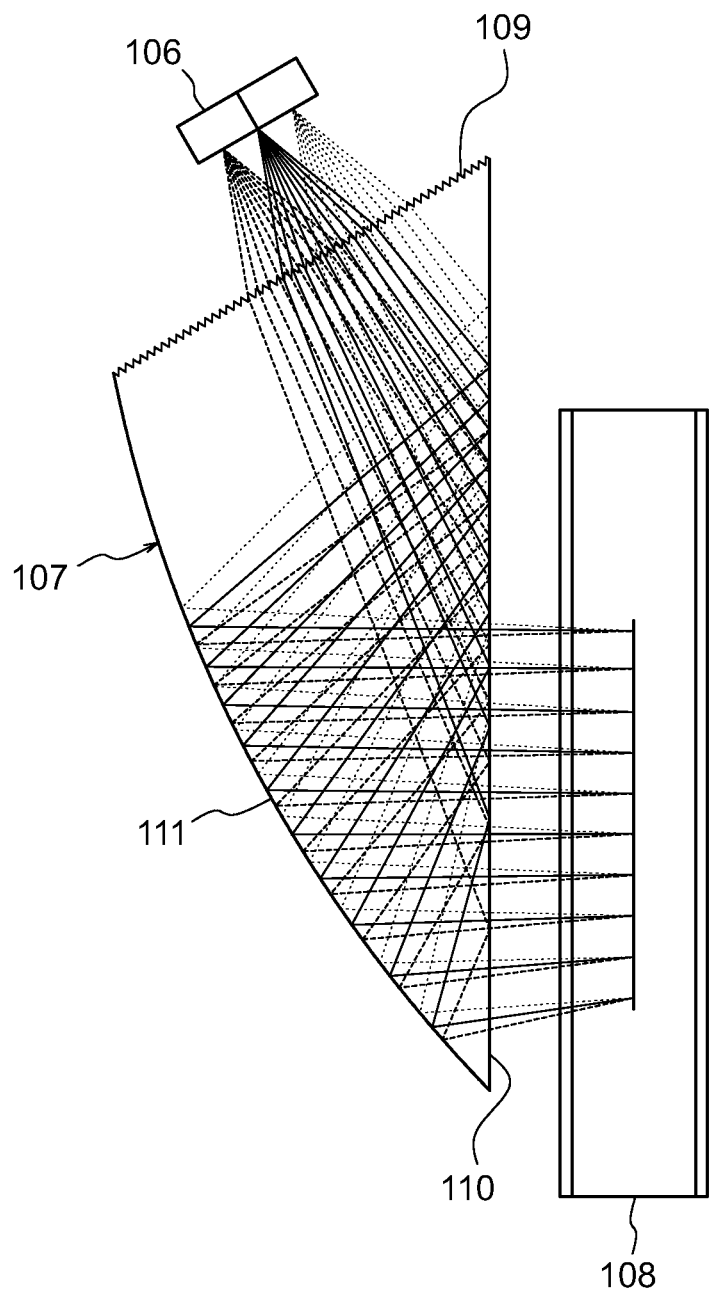
FIG. 4 is an enlarged view of an illumination prism.

As shown in FIG. 4, the incidence surface 109 is subjected to surface treatment for forming fine unevenness so as to diffuse light, such as a graining process. By performing such surface treatment for diffusing light, it is possible to enlarge a small-size light source such as an LED to form a secondary source.

Referring again to FIG. 2, the display device 108 is disposed at a position on which the illumination light passing through the emission surface 110 is incident. The display device 108 is, for example, a transmissive LCD display device. The display device 108 forms and transmits image light corresponding to an image to allow an observer to observe by modulating a light flux of the illumination light to be transmitted for each pixel arranged in a two-dimensional shape.

The at least one eyepiece optic 102 is disposed in the emission direction of the image light from the display device 108. A gap is formed between the display device 108 and the at least one eyepiece optic 102 in a housing 114 of the apparatus body 101 so as to transmit image light.

The at least one eyepiece optic 102 includes an eyepiece prism 115 and an eyepiece surface 116 (eyepiece surface). In this embodiment, the eyepiece prism 115 is a prism having a first, and up to and including six faces. The eyepiece prism 115 is formed to have the outer shape to be described below.

Figure 5:
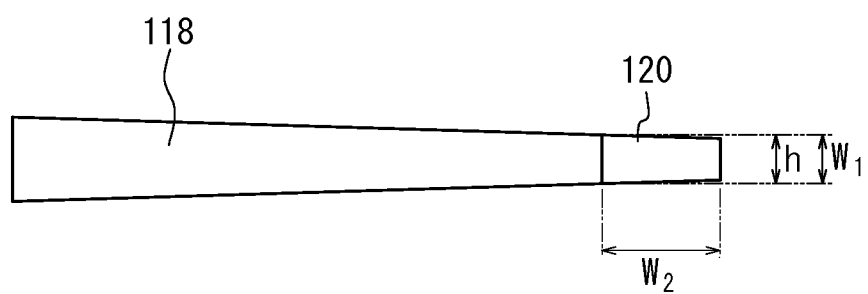
FIG. 5 is a diagram illustrating an appearance of an eyepiece prism when seen from a second surface.
Figure 22:
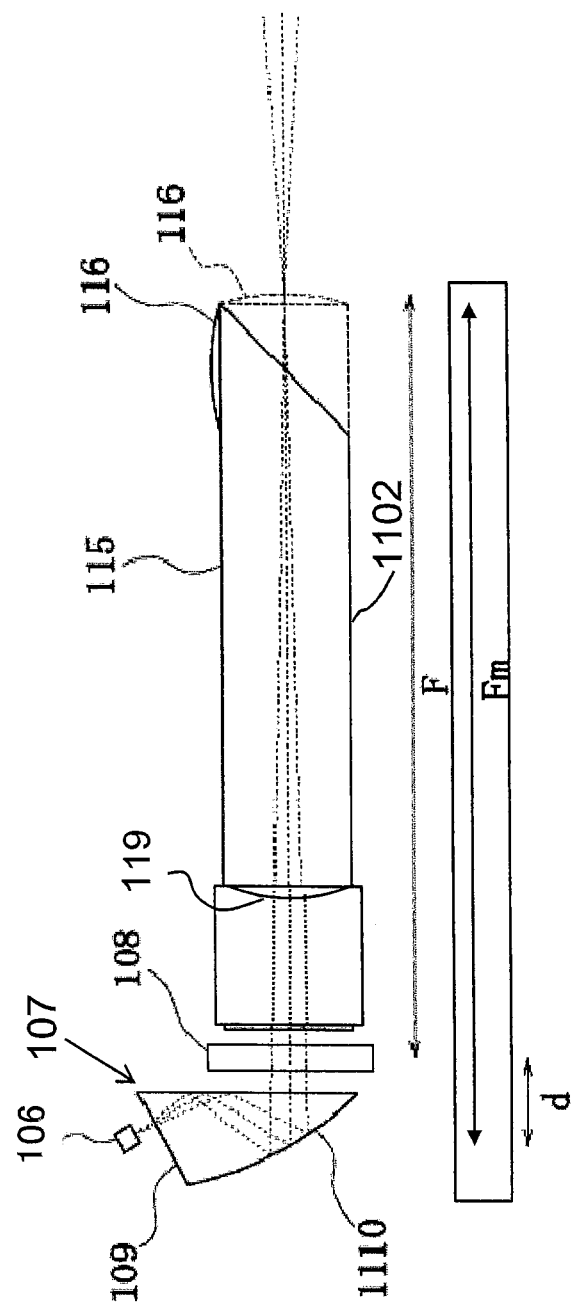
FIG. 22 is an optical path diagram illustrating a focal position of the light source image in the second plane in the image display apparatus according to another example of the third embodiment.

In this embodiment, the first surface 117 and the second surface 118 constitute an isosceles trapezoid (see FIG. 5) and are parallel or substantially parallel to each other. The third surface 119 serving as an image incidence surface is a surface on the lower side of the first surface 117 and the second surface 118 and is perpendicular or substantially perpendicular to the first surface 117 and the second surface 118 (see FIGS. 2 and 5). The third surface 119 can be a flat surface or a curved surface as shown in FIG. 22. The fourth surface 120 is a surface opposed to the third surface 119 and is inclined by about 45° about the first surface 117 and the third surface 119. The height $h(W_1)$ of the portion of the first surface 117 located just in front of an observer's eye at the time of wearing the eyeglasses in the vicinity of the end close to the fourth surface 120 and the fourth surface 120 is smaller than the height of the third surface 119 and, in this embodiment, is about 4 mm or less (see FIG. 5).

The eyepiece surface 116 is a mono-convex lens and the plane thereof is bonded to the vicinity of the end of the first surface 117 of the eyepiece prism 115 close to the fourth surface 120 (see FIG. 2). The eyepiece surface 116 is formed so that the length in the height direction hd (first direction) of the first surface 117 is equal to or less than about 4 mm and is smaller than the length in the length direction wd (second direction) of the first surface 117. The length of the eyepiece surface 116 in the height direction hd is smaller than the length in the height direction of the third surface 119 and the area of the eyepiece surface 116 is smaller than the area of the third surface 119.

The eyepiece prism 115 is fixed to the apparatus body 101 so that the emission direction of the image light from the display device 108 is perpendicular or substantially perpendicular to the third surface 119 and the eyepiece surface 116 surface an observer's eye when the observer wears the image display apparatus 100.

By fixing the at least one eyepiece optic 102 to the apparatus body 101 as described above, the image light incident on the at least one eyepiece optic 102 is reflected to the eyepiece surface 116 by the fourth surface 120. The image light is transmitted from the eyepiece surface 116 and is incident on the observer's eye, whereby the observer can observe the image light.

Since the length in the height direction hd of the eyepiece prism 115 and the eyepiece surface 116 is equal to or less than about 4 mm, it is possible to dispose the at least one eyepiece optic 102 in front of the observer's eye and to observe the image light without blocking the external surrounding. A human pupil diameter varies between 2 mm and 8 mm depending on brightness and is about 4 mm in an environment of average brightness. Therefore, since the at least one eyepiece optic 102 serving as a shield disposed in front of a human eye is smaller than the pupil diameter, it is possible to observe a distant field of view without the field of view being shielded.

The configuration of the illumination prism 107 will be described in detail below. In order to describe the configuration of the illumination prism 107, a plane including the central ray CR of the image light transmitted through the display device 108 and parallel or substantially parallel to the height direction hd of the eyepiece prism 115 is defined as a first plane (see FIG. 2). A plane including the central ray CR of the image light transmitted through the display device 108 and perpendicular or substantially perpendicular to the first plane is defined as a second plane. When the light source is used as an object point, a sagittal plane of the illumination prism 107 corresponds to the first plane and a meridional plane thereof corresponds to the second plane.

The meridional plane is a plane including an optical axis of an optical system and an object point or a principal ray when the light source is set as an off-axis object point. The sagittal plane is a plane including the principal ray and is perpendicular or substantially perpendicular to the meridional plane. When the optical system is eccentric, the above definition is applied in consideration of the eccentricity.

By adjusting the radius of curvature of the reflecting surface 111 in the first plane, the focal position in the first plane of the secondary light source formed on the incidence surface 109 can be adjusted. By adjusting the radius of curvature of the reflecting surface 111 in the second plane, the focal position in the second plane of the secondary light source formed on the incidence surface 109 can be adjusted.

Figure 6:
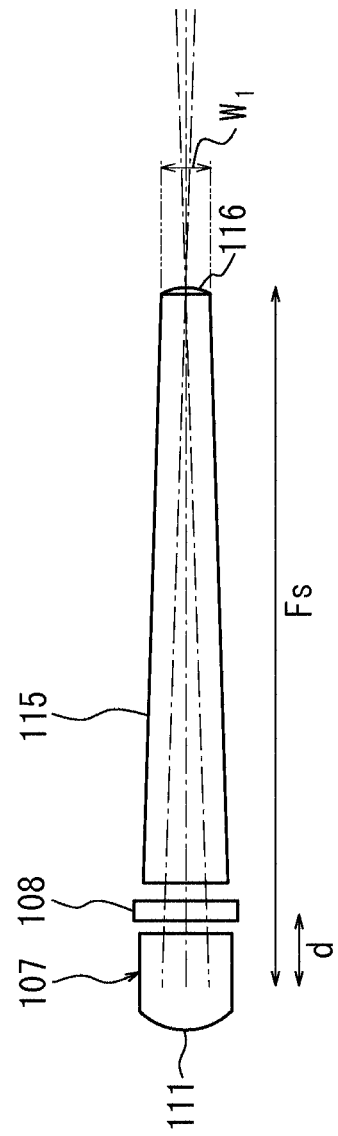
FIG. 6 is an optical path diagram illustrating a focal position of a light source image in a first plane in the image display apparatus according to the first embodiment.
Figure 7:
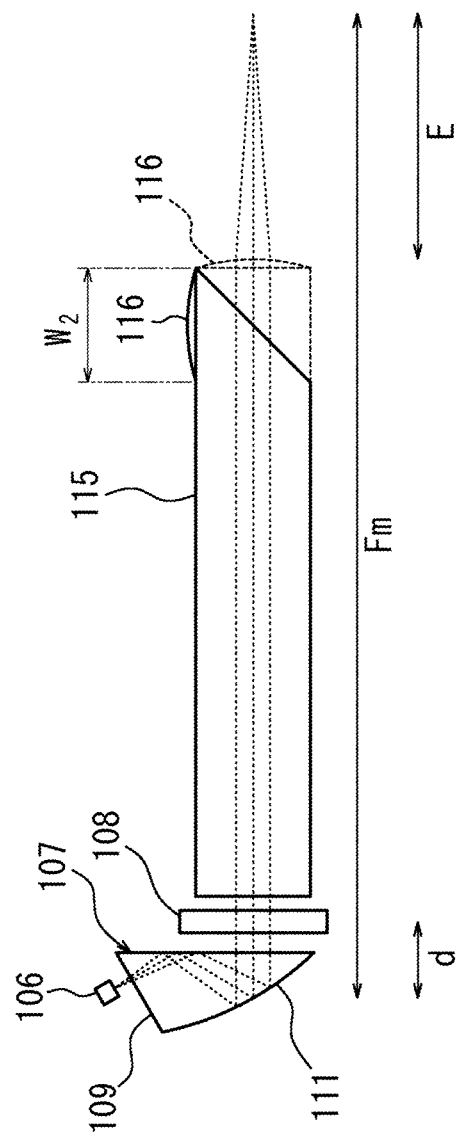
FIG. 7 is an optical path diagram illustrating a focal position of the light source image in a second plane in the image display apparatus according to the first embodiment.

As shown in FIG. 6, the reflecting surface 111 is formed so that the secondary light source formed on the incidence surface 109 is substantially focused on the eyepiece surface 116 in the first plane. Here, d represents the optical path length from the display device 108 to the reflecting surface 111. Fs represents a (sagittal) focal distance of the reflecting surface 111 in the first plane when the incidence surface 109 is set as an object point. L represents an optical-axis optical path length from the reflecting surface 111 to the eyepiece surface 116. As shown in FIG. 7, the reflecting surface 111 is formed so that the secondary light source formed on the incidence surface 109 is focused on the outside of the eyepiece surface 116 in the second plane. Here, Fm represents a (meridional) focal distance of the reflecting surface 111 in the second plane when the incidence surface 109 is set as an object point. E represents the eye relief that is a value set as a distance from the eyepiece surface 116 to the surface of the eye at the time of wearing the eyeglasses 104 having the image display apparatus 100 mounted thereon. The outside of the eyepiece surface 116 is a space extending to the opposite side of the display device 108 along the optical axis of the at least one eyepiece optic 102.

The reflecting surface 111 is formed so that (Fs+E) is substantially equal to Fm (see FIGS. 6 and 7).

The focal position of the secondary light source formed on the incidence surface 109 as described above can be adjusted by forming the reflecting surface 111 so that Rs<Rm. Here, Rs represents the radius of curvature of the reflecting surface 111 in the first plane. Rm represents the radius of curvature of the reflecting surface 111 in the second plane. When the radius of curvature of the eyepiece surface 116 is defined as R, the eyepiece surface 116 is formed to satisfy Rs<R<Rm.

The position at which the image of the light source is formed in the first plane may be set to the vicinity of the eyepiece surface 116 so as to satisfy $L-Am(W_2)<Fs<L+Am(W_2)$. Here, $Am(W_2)$ represents an aperture width of the eyepiece surface 116 in the length direction.

In the image display apparatus according to the first embodiment having the above-mentioned configuration, it is possible to use illumination light with high efficiency and to reduce the size of the at least one eyepiece optic 102. These advantages will be described in brief below.

As described above, in the image display apparatus according to the related art, it is possible to reduce the size of the at least one illumination optic by combination of mirrors and it is possible to reduce the light flux of the image light which is not incident on the pupil by causing the light source and the optical pupil to be conjugate. At this time, the optical pupil is generally disposed in the vicinity of an eye such as a pupil. Therefore, illumination light for forming image light can be used with high efficiency. However, in order to achieve the increase in efficiency of illumination light, it is on the premise that vignetting of illumination light does not occur in the at least one eyepiece optic 102.

As in the first embodiment, when the sizes of the eyepiece prism 115 and the eyepiece surface 116 are restricted, the focal position of the light source (light source image) is disposed so as not to cause vignetting due to the at least one eyepiece optic 102. Specifically, in the first embodiment, the decrease in lengths in the height direction hd (see FIG. 2) of the eyepiece prism 115 and the eyepiece surface 116 is restricted. In this way, in the configuration in which a light source image is disposed to be conjugate with the vicinity position of an eye such as a pupil using the at least one eyepiece optic 102 that is small in the height direction hd, the transmission loss due to the vignetting of the at least one eyepiece optic 102 increases and the use efficiency of illumination light may be lowered.

Therefore, in the first embodiment, in the first plane, the secondary light source formed on the incidence surface 109 is focused on the eyepiece surface 116 (see FIG. 6). The first plane has a relationship parallel or substantially parallel to the height direction hd in which lengths of constituent members of the at least one eyepiece optic 102 are restricted. By employing this configuration, it is possible to reduce the transmission loss. By lowering the transmission loss, it is possible to enhance the use efficiency of illumination light as a whole.

By focusing the second light source on the eyepiece surface 116, the width in the height direction of a light flux transmitted from the eyepiece surface 116 of the at least one eyepiece optic 102 can be made to be smaller than the width in the height direction of a light flux incident on the third surface 119. Accordingly, it is possible to lower the transmission loss and to reduce the size of the eyepiece surface 116. For example, since the third surface 119 is generally disposed in the vicinity of the display device 108, the aperture width of the third surface 119 is set to be larger than the width of an effective area of the display device 108 for receiving the image light from the display device 108. On the other hand, the eyepiece surface 116 can be set to be smaller than the width of the effective area of the display device 108 and it is thus possible to provide a smaller-size image display apparatus.

In the first embodiment, since the aperture width of the eyepiece surface 116 in a direction parallel or substantially parallel to the second plane has a sufficient value in the second plane, the secondary light source formed on the incidence surface 109 can be substantially focused on the pupil or the vicinity of the eye (see FIG. 7). The second plane has a relationship of passing through the optical axis of the eyepiece surface 116 with the length direction wd in which lengths of constituent members of the at least one eyepiece optic 102 are not restricted. By employing this configuration, it is possible to reduce a light flux of image light which cannot be incident on the pupil without increasing the transmission loss.

In the first embodiment, since the eyepiece surface 116 satisfies Rs<R<Rm, the light source image can be formed on a side closer to the display device 108 than to the vicinity of the eyepiece surface 116 or the eyepiece surface 116 in the first plane. In the second plane, the light source image can be brought close to the outside of the eyepiece surface 116 farther than the display device 108 or the pupil or the position around the eye. Since the light source image can be brought to different optimal positions in both planes, it is possible to further enhance the use efficiency of illumination light.

In the first plane, the image of the light source may be focused on the vicinity of the eyepiece surface 116 so as to satisfy L−Am(W$_2$)<Fs<L+Am(W$_2$). That is, since the area surrounded with the eyepiece surface 116 and the fourth surface 120 has a small size in the height direction hd, it is possible to achieve high use efficiency by narrowing the light flux passing through the area.

In the first embodiment, surface treatment for diffusing light is performed on a position farthest separated from the display device 108 on the optical path in the illumination prism 107. By employing this configuration, it is possible to enhance the use efficiency of illumination light and to improve image quality of image light. These advantages will be described below.

Since the secondary light source enlarged in light source size can be formed by performing the treatment for diffusing light, an exit pupil is filled with the light source image. By filling the exit pupil with the light source image, it is possible to reduce illumination unevenness which can occur with slight movement of the pupil from the observation position. However, when the surface treatment for diffusing light such as a graining process is performed, illumination light including an image of the unevenness shape of the diffusing surface is used to form image light and thus image quality of the image light may be lowered.

Therefore, in the first embodiment, the position subjected to the surface treatment is located at a position farthest separated from the display device 108 in the illumination prism 107. By employing this configuration, the influence of the unevenness shape of illumination light on the image light is reduced. In addition, by performing the surface treatment on the surface of the illumination prism 107, it is not necessary to dispose a particular diffusing plate or the like and it is thus possible to achieve a decrease in cost.

In the first embodiment, since the incidence surface 109 for enlarging the light source image is located to be closer to the light source 106 than the reflecting surface 111 having positive optical power, light diffused from the incidence surface 109 subjected to the diffusing process can be used as an enlarge secondary light source. By focusing the secondary light source through use of the reflecting surface 111, an enlarged light source image is obtained.

In the first embodiment, since the incidence surface 109 is covered with the mask 113, it is possible to reduce unnecessary light or stray light. By reducing unnecessary light or stray light, it is possible to reduce flare and ghost in the image light observed through the at least one eyepiece optic 102.

An image display apparatus according to a second embodiment of the present disclosure will be described below. The second embodiment is different from the first embodiment in the configuration of the reflecting surface in the illumination prism. Hereinafter, the second embodiment will be described. Constituents having the same functions and configurations as in the first embodiment will be referenced by the same reference numerals.

Figure 8:
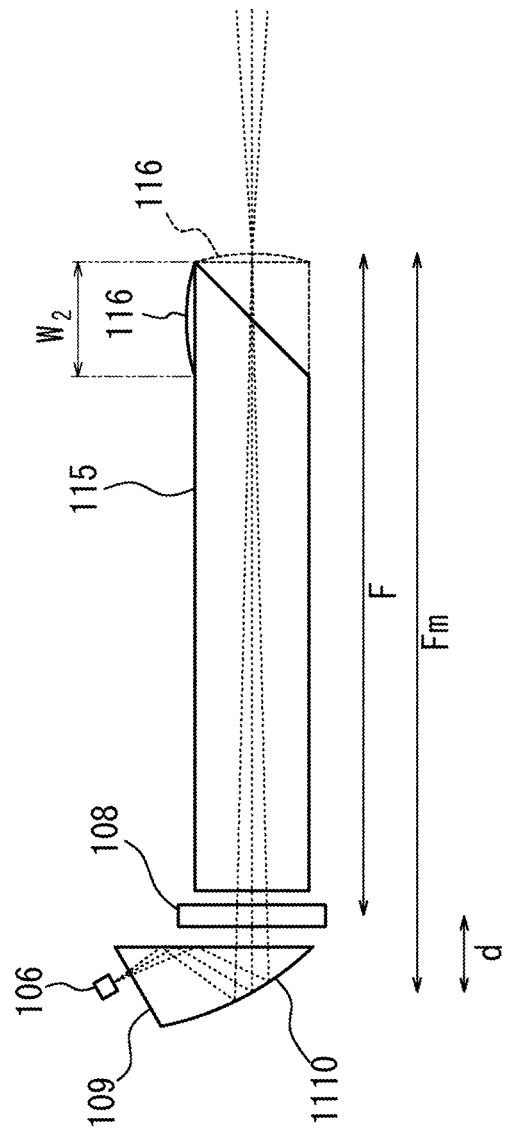
FIG. 8 is an optical path diagram illustrating a focal position of the light source image in the second plane in an image display apparatus according to a second embodiment.

The second embodiment is quite similar to the first embodiment in the configurations and the functions of constituents other than the illumination prism. Similarly to the first embodiment, as shown in FIG. 8 a reflecting surface 1110 is formed so that the secondary light source formed on the incidence surface 109 is substantially focused on the eyepiece surface 116 in the first plane (see FIG. 6). Unlike the first embodiment, the reflecting surface 1110 is formed so that the secondary light source formed on the incidence surface 109 is substantially focused on the eyepiece surface 116 in the second plane (see FIG. 8).

The reflecting surface 1110 is formed so that the object-side focal distance F of the eyepiece prism 115 is equal to (Fm−d) and (Fs−d). Here, d represents the optical path length from the display device 108 to the reflecting surface 1110.

Similarly to the first embodiment, the focal position of the secondary light source formed on the incidence surface 109 can be adjusted by forming the reflecting surface 1110 so as to satisfy Rs<Rm. Similarly to the first embodiment, the eyepiece surface 116 is formed so as to satisfy Rs<R<Rm.

In the image display apparatus according to the second embodiment having the above-mentioned configuration, similarly to the first embodiment, since the secondary light source on the incidence surface 109 is focused on the eyepiece surface 116, it is possible to achieve a decrease in size of the at least one eyepiece optic 102 and to use the illumination light with high efficiency.

Unlike the first embodiment, the light source image on the incidence surface 109 is also focused on the eyepiece surface 116 in the second plane. Accordingly, when the aperture width of the eyepiece surface 116 in the direction parallel or substantially parallel to the second plane is restricted, for example, when the aperture width of the eyepiece surface 116 in the direction parallel or substantially parallel to the second plane is determined to be equal to or less than about 4 mm, it is possible to reduce transmission loss in the second plane. Therefore, it is possible to improve use efficiency of illumination light.

According to the second embodiment, similarly to the first embodiment, since the position in the illumination prism 107 subjected to diffusing surface treatment is separated from the display device 108, it is possible to reduce an influence of the unevenness shape on the image light.

According to the second embodiment, similarly to the first embodiment, since Rs<R<Rm is satisfied, it is possible to further improve the use efficiency of illumination light.

According to the second embodiment, similarly to the first embodiment, since the incidence surface 109 subjected to the diffusing surface treatment is disposed to be closer to the light source 106 than the reflecting surface 1110 having positive optical power, light diffused from the incidence surface 109 subjected to the diffusing surface treatment can be used as a secondary light source. An enlarged light source image can be obtained by focusing the second light source by the use of the reflecting surface 1110.

According to the second embodiment, since the incidence surface 109 is covered with the mask 113, it is possible to reduce flare and ghost in the image light.

An image display apparatus according to a third embodiment of the present disclosure will be described below. The third embodiment is different from the first embodiment in the configuration of the reflecting surface in the illumination prism. Hereinafter, the third embodiment will be described. Constituents having the same functions and configurations as in the first embodiment will be referenced by the same reference numerals.

The third embodiment is equal to the first embodiment in the configurations and the functions of constituents other than the illumination prism.

Figure 9:
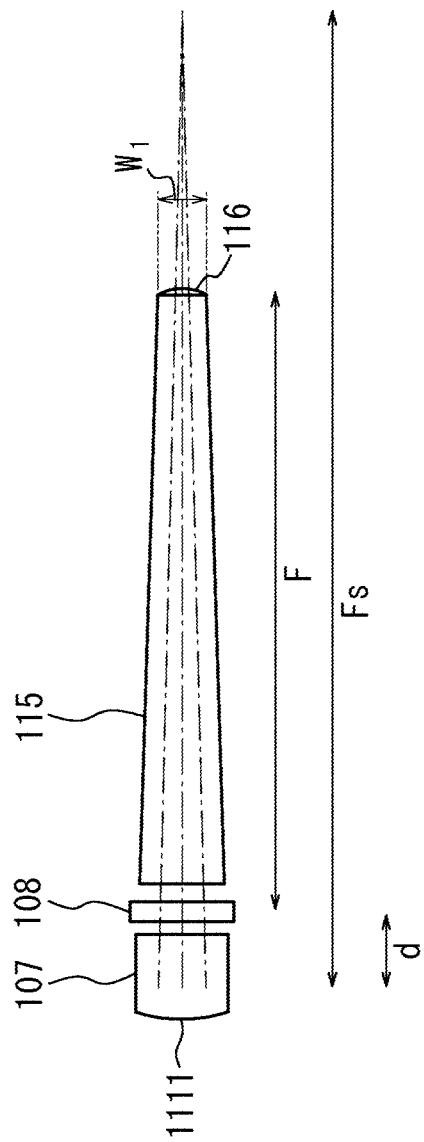
FIG. 9 is an optical path diagram illustrating a focal position of the light source image in the first plane in an image display apparatus according to a third embodiment.
Figure 10:
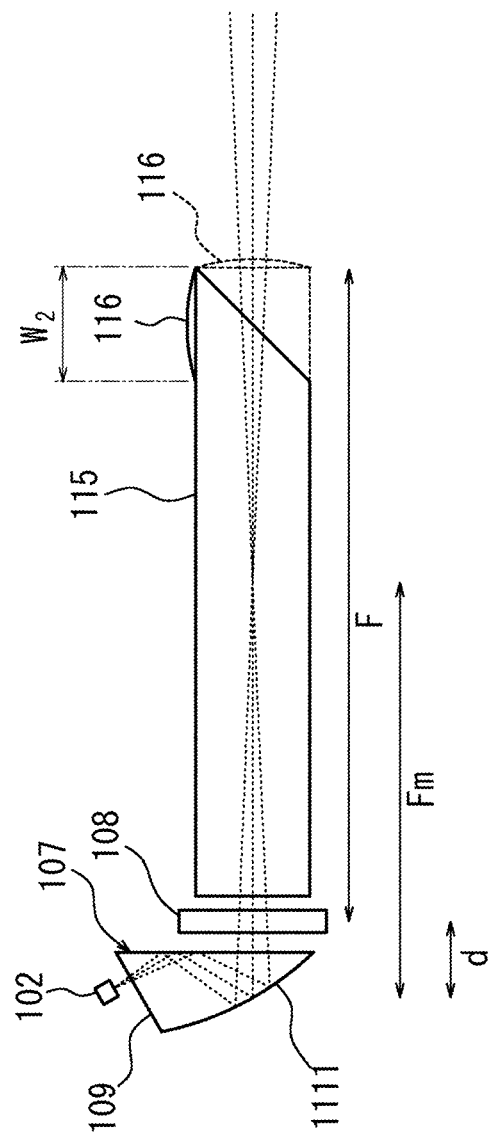
FIG. 10 is an optical path diagram illustrating a focal position of the light source image in the second plane in the image display apparatus according to the third embodiment.

In the third embodiment, a reflecting surface 1111 is formed on a spherical surface (see FIGS. 9 and 10). That is, Rs=Rm is satisfied, and the illumination prism 107 is not rotationally asymmetric about an optical axis but is eccentric. Therefore, the focal distance (see FIG. 9) of the reflecting surface 1111 in the first plane (Fs) and the focal distance (see FIG. 10) in the second plane (Fm) are greatly different from each other, and thus astigmatism occurs.

The reflecting surface 1111 is formed so that a light source image in a plane in which the focal distance is the shorter of the first plane and the second plane is focused inside the eyepiece prism 115. The reflecting surface 1111 is formed so that a light source image in the plane in which the focal distance is the longer of the first plane and the second plane is focused outside the eyepiece surface 116.

In this embodiment, the focal distance (see FIG. 9) in the first plane is longer than the focal distance (see FIG. 10) in the second plane. Accordingly, the reflecting surface 1111 is formed so that the secondary light source on the incidence surface 109 is focused outside the eyepiece surface 116 in the first plane and inside the eyepiece prism 115 in the second plane. The reflecting surface 1111 is formed to satisfy (Fm−d)<F<(Fs−d).

In the image display apparatus according to the third embodiment having the above-mentioned configuration, it is possible to achieve a decrease in size of the at least one eyepiece optic 102 and to use illumination light with high efficiency.

As described above, the eyepiece prism 115 in the third embodiment is restricted in size, and the transmission loss increases in the configuration in which the light source image is focused on a pupil and in the configuration in which the light source image is conjugate with the exit pupil of the at least one eyepiece optic 102. Particularly, when any of the light source images in the first plane and the second plane is focused inside the eyepiece prism 115 or outside the eyepiece prism 115, the transmission loss increases in any of the first plane and the second plane.

Therefore, as in the third embodiment, it is possible to reduce the transmission loss of illumination light by focusing the light source image inside the eyepiece prism 115 in one of the first plane and the second plane and focusing the light source image outside the eyepiece prism 115 in the other. By reducing the transmission loss, it is possible to improve the use efficiency of illumination light as a whole.

In the third embodiment, since the reflecting surface 1111 is formed in a spherical shape, the reflecting surface can be more easily formed than in an aspherical shape. Since the reflecting surface can be easily formed, it is possible to reduce a manufacturing cost.

In the third embodiment, since the reflecting surface 1111 is formed to satisfy (Fm−d)<F<(Fs−d), the focal position of a light source image in the first plane and the second plane can be appropriately set on the basis of the eyepiece surface 116. By optimizing the focal position of a light source image in the first plane and the second plane, it is possible to further improve the use efficiency of illumination light.

According to the third embodiment, similarly to the first embodiment, since the position in the illumination prism 107 subjected to the diffusing surface treatment is separated from the display device 108, it is possible to reduce an influence of the unevenness shape on the image light.

According to the third embodiment, similarly to the first embodiment, since the incidence surface 109 subjected to the diffusing surface treatment is disposed to be closer to the light source 106 than the reflecting surface 1111 having positive optical power, light diffused from the incidence surface 109 subjected to the diffusing surface treatment can be used as a secondary light source. An enlarged light source image can be obtained by focusing the second light source by the use of the reflecting surface 1111. According to the third embodiment, since the incidence surface 109 is covered with the mask 113, it is possible to reduce flare and ghost in the image light.

Another example of the third embodiment is shown in FIG. 9 and FIG. 22. In this example, the third surface 119 has a curved surface and has a positive power compared with third embodiment (FIG. 10). Therefore this example of the third embodiment has similar advantages with the third embodiment. Since the third surface 119 has a curved surface and has a positive power, both the at least one illumination optic 107 and the at least one eyepiece optic 102 focus an image of the light source on one of the eyepiece surface and the vicinity of the eyepiece surface in a first plane, the first plane comprising a central ray of the image light emitted from the display device. Further, as shown in FIG. 9 and FIG. 22, since the third surface 119 has a curved surface and has a positive power, both the at least one illumination optic 107 and the at least one eyepiece optic 102 focus the transmitted image light on the outside of the at least one eyepiece optic in a first plane, the first plane comprising a central ray of the image light transmitted from the display device, and focus the transmitted image light between the display device and the eyepiece surface in a second plane, the second plane different from the first plane and the second plane comprising the central ray.

Figure 11:
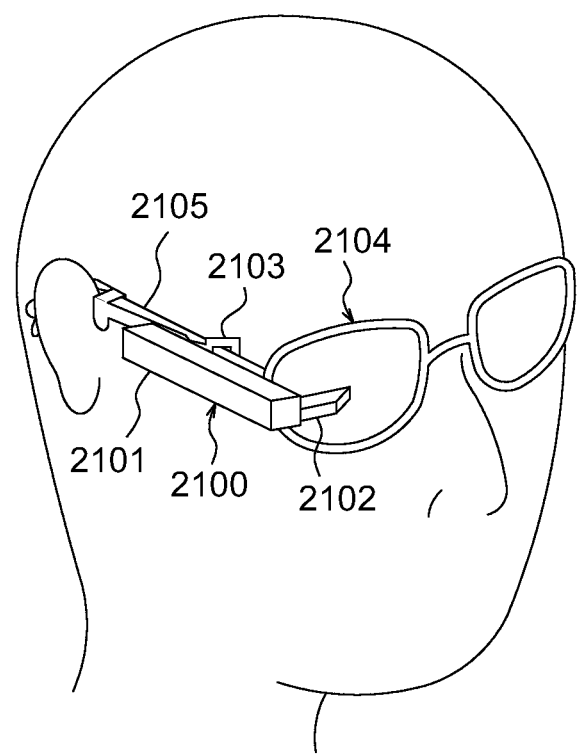
FIG. 11 is a perspective view illustrating an appearance of an observer wearing eyeglasses, which are mounted with an image display apparatus according to a fourth embodiment of the present disclosure, on the head thereof.

An image display apparatus according to a fourth embodiment of the present disclosure will be described below. As shown in FIG. 11, an image display apparatus 2100 includes an apparatus body 2101 and an at least one eyepiece optic 2102. The apparatus body 2101 can be mounted on a temple 2105 of eyeglasses 2104 using an engagement member 2103 such as a hook. The at least one eyepiece optic 2102 is formed to extend from the apparatus body 2101 to the front of an observer's eye. The apparatus body 2101 forms an image to be observed and emits the formed image as image light. The at least one eyepiece optic 2102 guides the image light from the apparatus body 2101 to the observer's eye, and can guide the image light from the apparatus body 2101 to the observer's eye in a state where the observer wears the eyeglasses 2104 having the apparatus body 2101 mounted thereon.

Figure 12:
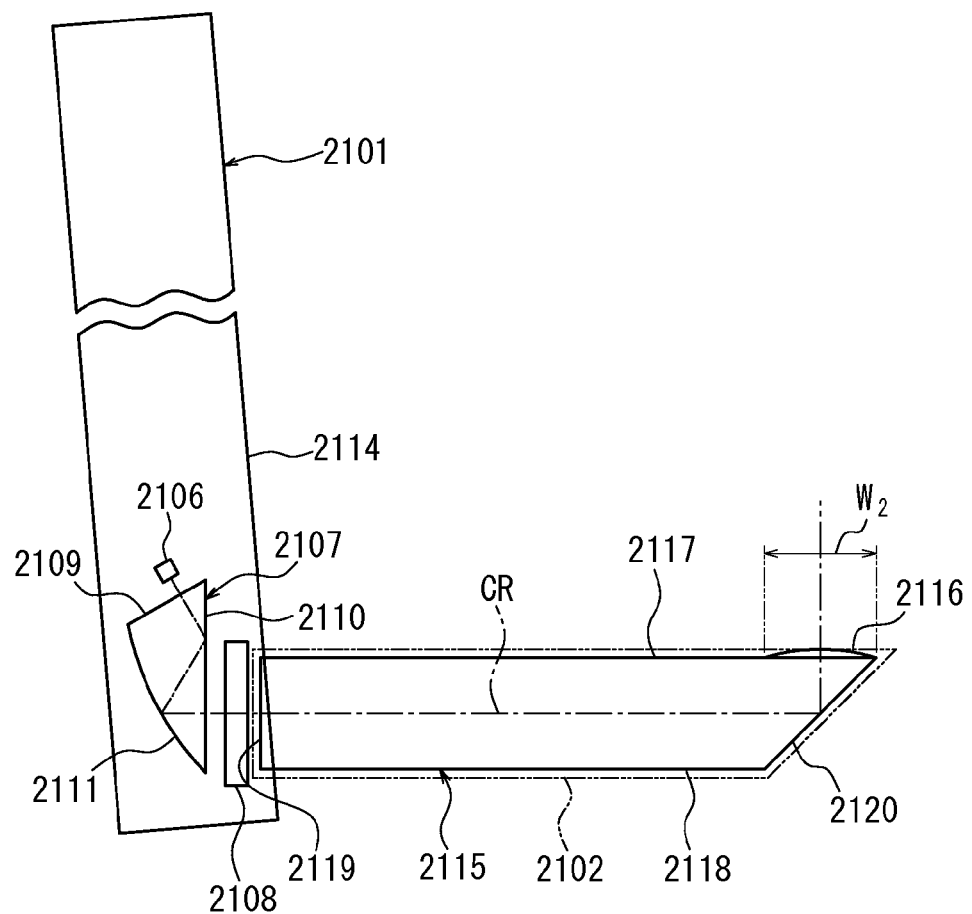
FIG. 12 is a cross-sectional view of the image display apparatus according to the fourth embodiment.

As shown in FIG. 12, the apparatus body 2101 is provided with a light source 2106, an illumination prism 2107, a display device 2108, and the like. The light source 2106 is, for example, an LED and emits illumination light. The illumination prism 2107 includes an incidence surface 2109, an emission surface 2110, and a reflecting surface 2111. The illumination prism 2107 is disposed so that the illumination light emitted from the light source 2106 is incident on the incidence surface 2109.

Figure 13:
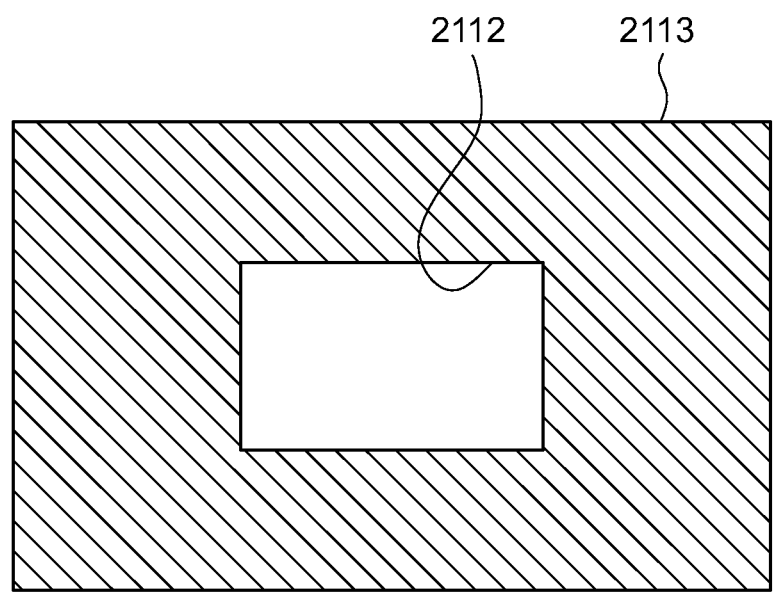
FIG. 13 is a front view of a mask.

The incidence surface 2109 of the illumination prism 2107 is preferably covered with a mask 2113 on which a rectangular aperture 2112 is formed as shown in FIG. 13. Two sides of the aperture 2112 are parallel or substantially parallel to a height direction hd to be described later. Two sides perpendicular or substantially perpendicular to the height direction hd are longer than the two sides parallel or substantially parallel thereto. A light flux of illumination light passing through the aperture 2112 is incident on the incidence surface 2109.

As shown in FIG. 12, an at least one illumination optic, shown as illumination prism 2107, is formed and disposed so that the emission surface 2110 reflects the illumination light incident on the illumination prism 2107 to the reflecting surface 2111, the reflecting surface 2111 reflects the reflected illumination light so as to be incident on the emission surface 2110 to be perpendicular or substantially perpendicular thereto, and the emission surface 2110 transmits the illumination light incident to be perpendicular or substantially perpendicular thereto. The illumination optic, such as illumination prism 2107, can be any suitable element that can transmit illumination light from the light source to the display device and that has a positive optical power, including but not limited to one or more illumination prisms and one or more mirrors. The emission surface 2110 may reflect totally or partly, as desired. The reflecting surface 111 may reflect totally or partly, as desired. The shape of the reflecting surface 2111 of the illumination prism 2107 will be described later in detail.

As described below, by using the reflecting surface 2111 having optical power as an element of an at least one illumination optic which is rotationally asymmetric about the optical axis from the light source 2106 to the emission surface 2110 in this way, it is possible to transmit an optical path compactly and to use a small-size illumination prism.

Figure 14:
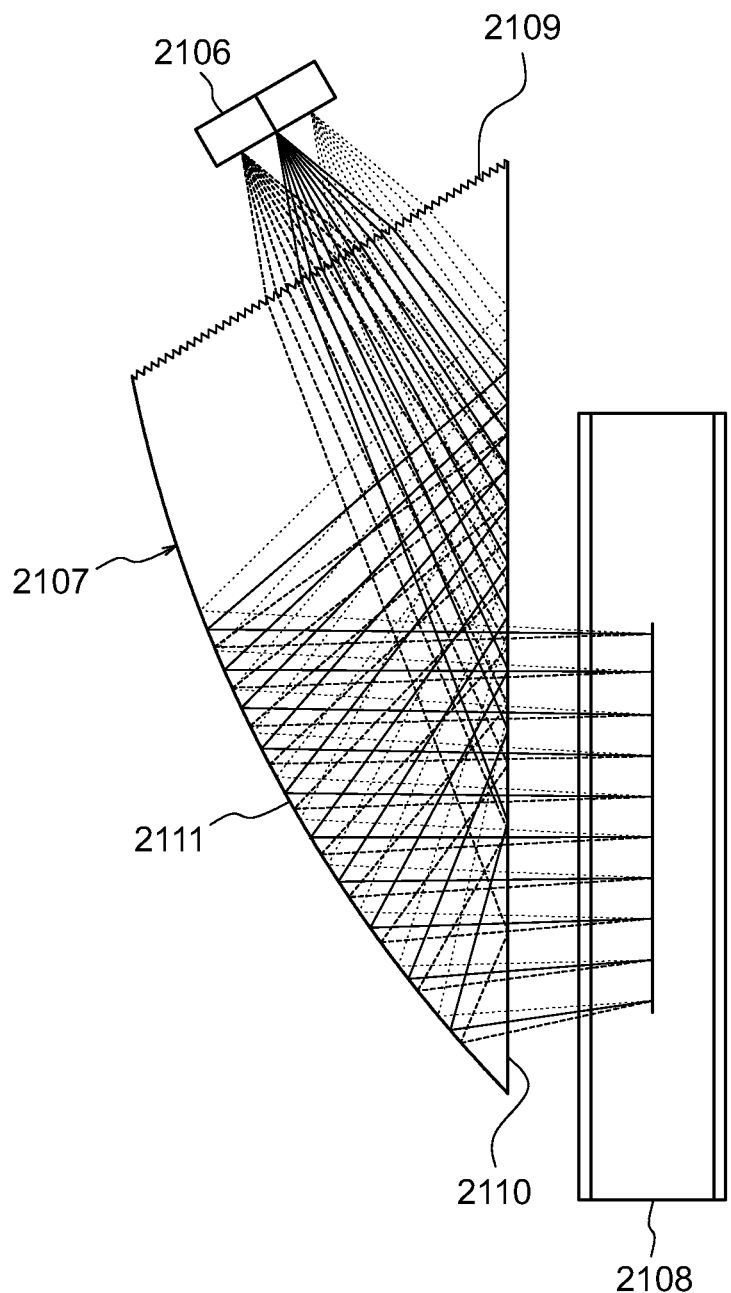
FIG. 14 is an enlarged view of an illumination prism.

As shown in FIG. 14, the incidence surface 2109 is subjected to surface treatment for forming fine unevenness so as to diffuse light, such as a graining process. By performing such surface treatment for diffusing light, it is possible to enlarge a small-size light source such as an LED to form a secondary light source.

The display device 2108 is disposed at a position on which the illumination light passing through the emission surface 2110 is incident. The display device 2108 is, for example, a transmissive LCD display device. The display device 2108 forms and transmits image light corresponding to an image to allow an observer to observe by modulating a light flux of the illumination light to be transmitted for each pixel arranged in a two-dimensional shape.

The at least one eyepiece optic 2102 is disposed in the emission direction of the image light from the display device 2108. A gap is formed between the display device 2108 and the at least one eyepiece optic 2102 in a housing 2114 of the apparatus body 2101 so as to transmit image light.

The at least one eyepiece optic 2102 includes an eyepiece prism 2115 and an eyepiece surface 2116 (eyepiece surface) (see FIG. 12). In this embodiment, the eyepiece prism 2115 is a prism having first to sixth faces. The eyepiece prism 2115 is formed to have the outer shape to be described below, but can be in any suitable shape.

Figure 15:
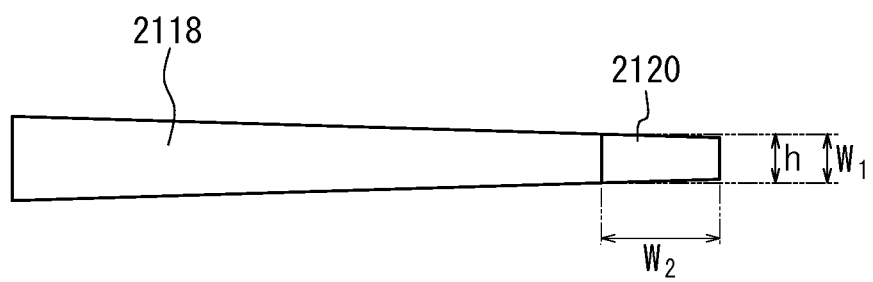
FIG. 15 is a diagram illustrating an appearance of an eyepiece prism when seen from a second surface.

The first surface 2117 and the second surface 2118 constitute an isosceles trapezoid (see FIG. 15) and are parallel or substantially parallel to each other. The third surface 2119 serving as an image incidence surface is a surface on the lower side of the first surface 2117 and the second surface 2118 and is perpendicular or substantially perpendicular to the first surface 2117 and the second surface 2118 (see FIGS. 12 and 15). The fourth surface 2120 is a surface opposed to the third surface 2119 and is inclined by about 45° about the first surface 2117 and the third surface 2119. The height $h(W_1)$ (see FIG. 15) of the portion of the first surface 2117 located just in front of an observer's eye in the vicinity of the end close to the fourth surface 2120 and the fourth surface 2120 is smaller than the height of the third surface 2119 and is about 4 mm or less (see FIG. 15).

The eyepiece surface 2116 is a mono-convex lens and the plane thereof is bonded to the vicinity of the end of the first surface 2117 of the eyepiece prism 2115 close to the fourth surface 2120 (see FIG. 12). The eyepiece surface 2116 is formed so that the length in the height direction hd (first direction) of the first surface 2117 is equal to or less than about 4 mm and is smaller than the length in the length direction wd (second direction) of the first surface 2117. The length of the eyepiece surface 2116 in the height direction hd is smaller than the length in the height direction of the third surface 2119 and the area of the eyepiece surface 2116 is smaller than the area of the third surface 2119.

The eyepiece prism 2115 is fixed to the apparatus body 2101 so that the emission direction of the image light from the display device 2108 is perpendicular or substantially perpendicular to the third surface 2119 and the eyepiece surface 2116 surface an observer's eye when the observer wears the image display apparatus 2100.

By fixing the at least one eyepiece optic 2102 to the apparatus body 2101 as described above, the image light incident on the at least one eyepiece optic 2102 is reflected to the eyepiece surface 2116 by the fourth surface 2120. The image light is transmitted from the eyepiece surface 2116 and is incident on the observer's eye, whereby the observer can observe the image light.

Since the length in the height direction hd of the eyepiece prism 2115 and the eyepiece surface 2116 is equal to or less than about 4 mm, it is possible to dispose the at least one eyepiece optic 2102 in front of the observer's eye and to observe the image light without blocking an external system. A human pupil diameter varies between 2 mm and 8 mm depending on brightness and is about 4 mm in an environment of average brightness. Therefore, since the at least one eyepiece optic 2102 serving as a shield disposed in front of a human eye is smaller than the pupil diameter, it is possible to observe a distant field of view without the field of view being shielded.

The configuration of the illumination prism 2107 will be described in detail below. When the light source 2106 is used as an object point, a sagittal plane and a meridional plane of the illumination prism 2107 are set as the first plane and the second plane, respectively. The meridional plane is a plane including an optical axis of an optical system and an object point or a principal ray when the light source is set as an off-axis object point. The sagittal plane is a plane including the principal ray and perpendicular or substantially perpendicular to the meridional plane. When the optical system is eccentric, the above definition is applied in consideration of the eccentricity.

The eyepiece prism 2115 is mounted on the apparatus body 2101 so that the first surface 2117 and the second surface 2118 are parallel or substantially parallel to the first plane (sagittal plane) and the plane perpendicular or substantially perpendicular to the first surface 2117 and the third surface 2119 is parallel or substantially parallel to the second plane (meridional plane).

Therefore, the first plane (sagittal plane) is a plane including the central ray CR of the image light transmitted through the display device 2108 and parallel or substantially parallel to the height direction hd of the eyepiece prism 2115. The second plane (meridional plane) is a plane including the central ray CR of the image light transmitted through the display device 2108 and perpendicular or substantially perpendicular to the first plane.

By adjusting the radius of curvature of the reflecting surface 2111 in the first plane (sagittal plane), the focal position in the first plane of the secondary light source formed on the incidence surface 2109 can be adjusted. By adjusting the radius of curvature of the reflecting surface 2111 in the second plane (meridional plane), the focal position in the second plane of the secondary light source formed on the incidence surface 2109 can be adjusted.

Figure 16:
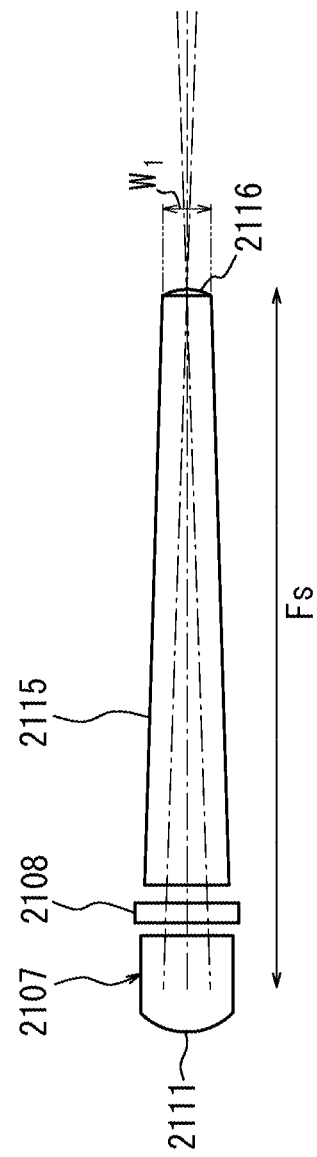
FIG. 16 is an optical path diagram illustrating a focal position of a light source image in a first plane in the image display apparatus according to the fourth embodiment.
Figure 17:
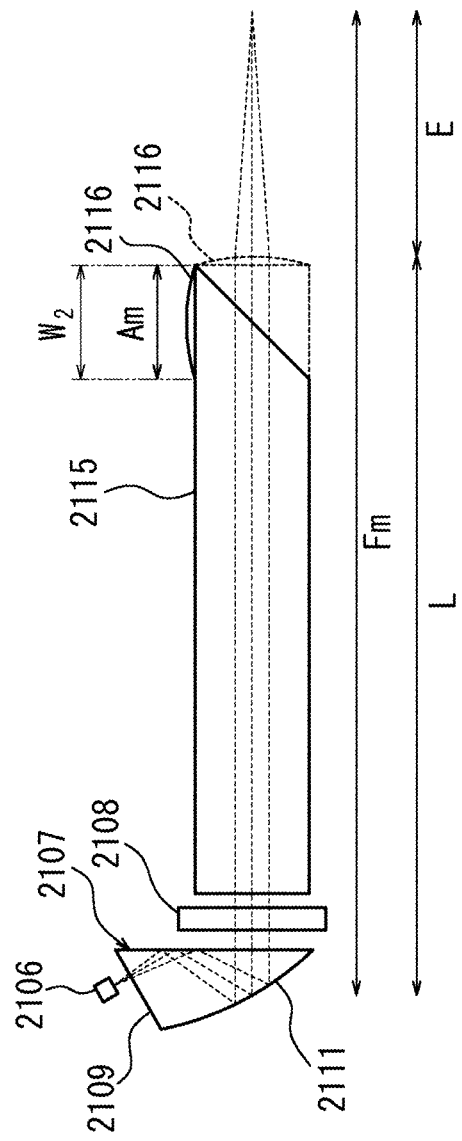
FIG. 17 is an optical path diagram illustrating a focal position of the light source image in the second plane in the image display apparatus according to the fourth embodiment.

As shown in FIG. 16, the reflecting surface 2111 is formed so that an image of the secondary light source formed on the incidence surface 2109 is substantially focused on the eyepiece surface 2116 in the first plane (sagittal plane). As shown in FIG. 17, the reflecting surface 2111 is formed so that the secondary light source formed on the incidence surface 2109 is focused on the outside of the eyepiece surface 2116 in the second plane (meridional plane). The outside of the eyepiece surface 2116 is a space extending to the opposite side of the display device 2108 along the optical axis of the at least one eyepiece optic 2102.

The reflecting surface 2111 is formed so that (L+E) is substantially equal to Fm (see FIG. 17). Here, E represents the eye relief and is a value assumed as a distance from the eyepiece surface 2116 to the surface of the eye at the time of wearing the eyeglasses 2104 having the image display apparatus 2100 mounted thereon. L represents an optical-axis optical path length from the reflecting surface 2111 to the eyepiece surface 2116. Fm represents a focal distance of the reflecting surface 2111 in the second plane (meridional plane) when the incidence surface 2109 is set as an object point.

The focal position of the secondary light source formed on the incidence surface 2109 as described above can be adjusted by forming the reflecting surface 2111 so as to satisfy Rs<Rm. Here, Rs represents the radius of curvature of the reflecting surface 2111 in the first plane (sagittal plane). Rm represents the radius of curvature of the reflecting surface 2111 in the second plane (meridional plane). When the radius of curvature of the eyepiece surface 2116 is defined as R, the eyepiece surface 2116 is formed to satisfy Rs<R<Rm.

The position at which the image of the light source is formed in the first plane may be set to the vicinity of the eyepiece surface 2116 so as to satisfy $L-Am(W_2)<Fs<L+Am(W_2)$. Here, Fs represents a focal distance of the reflecting surface 2111 with the incidence surface 2109 as an object point in the first plane, and $Am(W_2)$ represents an aperture width of the eyepiece surface 2116 in the length direction (see FIG. 17).

In the image display apparatus according to the fourth embodiment having the above-mentioned configuration, it is possible to use illumination light with high efficiency and to reduce the size of the at least one eyepiece optic 2102. These advantages will be described in brief below.

As described above, in the image display apparatus according to the related art, it is possible to reduce the size of the at least one illumination optic by combination of mirrors and it is possible to reduce the light flux of the image light which is not incident on the pupil by causing the light source and the optical pupil to be conjugate. At this time, the optical pupil is generally disposed in the vicinity of an eye such as a pupil. Therefore, illumination light for forming image light can be used with high efficiency. However, in order to achieve the increase in efficiency of illumination light, it is on the premise that vignetting of illumination light does not occur in the at least one eyepiece optic 2102.

As in the fourth embodiment, when the sizes of the eyepiece prism 2115 and the eyepiece surface 2116 are restricted, it is possible to dispose the focal position of the light source (light source image) so as not to cause vignetting due to the at least one eyepiece optic 2102. Specifically, in the fourth embodiment, the decrease in lengths in the height direction hd (see FIG. 12) of the eyepiece prism 2115 and the eyepiece surface 2116 is restricted. In this way, in the configuration in which a light source image is disposed to be conjugate with the vicinity position of an eye such as a pupil using the at least one eyepiece optic 2102 small in the height direction hd, the transmission loss due to the vignetting of the at least one eyepiece optic 2102 increases and the use efficiency of illumination light may be lowered.

Therefore, in the fourth embodiment, in the first plane (sagittal plane), the secondary light source formed on the incidence surface 2109 is focused on the eyepiece surface 2116 (see FIG. 16). The first plane (sagittal plane) has a relationship parallel or substantially parallel to the height direction hd in which lengths of constituent members of the at least one eyepiece optic 2102 are restricted. By employing this configuration, it is possible to reduce the transmission loss. By lowering the transmission loss, it is possible to enhance the use efficiency of illumination light as a whole.

By focusing the second light source on the eyepiece surface 2116, the width in the height direction hd of a light flux transmitted from the eyepiece surface 2116 of the at least one eyepiece optic 2102 can be made to be smaller than the width in the height direction hd of a light flux incident on the third surface 2119. Accordingly, it is possible to lower the transmission loss and to reduce the size of the eyepiece surface 2116. For example, since the third surface 2119 is generally disposed in the vicinity of the display device 2108, the aperture width of the third surface 2119 needs to be set to be larger than the width of an effective area of the display device 2108 for receiving the image light from the display device 2108. On the other hand, the eyepiece surface 2116 can be set to be smaller than the width of the effective area of the display device 2108 and it is thus possible to provide a smaller-size image display apparatus.

In the fourth embodiment, since the aperture width of the eyepiece surface 2116 in a direction parallel or substantially parallel to the second plane (meridional plane) has a sufficient value in the second plane, the secondary light source formed on the incidence surface 2109 can be substantially focused on the pupil or the vicinity of the eye (see FIG. 17). The second plane passes through the optical axis of the eyepiece surface 2116 with the length direction wd in which lengths of constituent members of the at least one eyepiece optic 2102 are restricted. By employing this configuration, it is possible to reduce a light flux of image light which cannot be incident on the pupil without increasing the transmission loss.

In the fourth embodiment, since the eyepiece surface 2116 satisfies Rs<R<Rm, the light source image can be formed on a side closer to the display device 2108 than to the vicinity of the eyepiece surface 2116 or the eyepiece surface 2116 in the first plane. In the second plane (meridional plane), the light source image can be brought close to the outside of the eyepiece surface 2116 farther than the display device 2108 or the pupil or the position around the eye. Since the light source image can be brought to different optimal positions in both planes, it is possible to further enhance the use efficiency of illumination light.

In the first plane (sagittal plane), the image of the light source may be focused on the vicinity of the eyepiece surface 2116 so as to satisfy $L-Am(W_2)<Fs<L+Am(W_2)$. That is, since the area surrounded with the eyepiece surface 2116 and the fourth surface 2120 has a small size in the height direction hd, it is possible to achieve high use efficiency by narrowing the light flux passing through the area.

In the fourth embodiment, surface treatment for diffusing light is performed on a position farthest separated from the display device 2108 on the optical path in the illumination prism 2107. By employing this configuration, it is possible to enhance the use efficiency of illumination light and to improve image quality of image light. These advantages will be described below.

Since the secondary light source enlarged in light source size can be formed by performing the treatment for diffusing light, an exit pupil is filled with the light source image. By filling the exit pupil with the light source image, it is possible to reduce illumination unevenness which can occur with slight movement of the pupil from the observation position. However, when the surface treatment for diffusing light such as a graining process is performed, illumination light including an image of the unevenness shape of the diffusing surface is used to form image light and thus image quality of the image light may be lowered.

Therefore, in the fourth embodiment, the position subjected to the surface treatment is located at a position farthest separated from the display device 2108 in the illumination prism 2107. By employing this configuration, the influence of the unevenness shape of illumination light on the image light is reduced. In addition, by performing the surface treatment on the surface of the illumination prism 2107, it is not necessary to dispose a particular diffusing plate or the like and it is thus possible to achieve a decrease in cost.

In the fourth embodiment, since the incidence surface 2109 for enlarging the light source image is located to be closer to the light source 2106 than the reflecting surface 2111 having positive optical power, light diffused from the incidence surface 2109 subjected to the diffusing process can be used as an enlarged secondary light source. By focusing the secondary light source by the use of the reflecting surface 2111, an enlarged light source image is obtained.

In the fourth embodiment, since the incidence surface 2109 is covered with the mask 2113, it is possible to reduce unnecessary light or stray light. By reducing unnecessary light or stray light, it is possible to reduce flare and ghost in the image light observed through the at least one eyepiece optic 2102.

An image display apparatus according to a fifth embodiment of the present disclosure will be described below. The fifth embodiment is different from the fourth embodiment in the configuration of the reflecting surface in the illumination prism. Hereinafter, the fifth embodiment will be described. Constituents having the same functions and configurations as in the fourth embodiment will be referenced by the same reference numerals.

The fifth embodiment is equal to the fourth embodiment in the configurations and the functions of constituents other than the illumination prism.

Unlike the fourth embodiment, a reflecting surface 21110 is formed so that an image of a secondary light source formed on the incidence surface 2109 is substantially focused inside the eyepiece prism 2115 in the first plane (sagittal plane) (see FIG. 18) and is focused outside the eyepiece surface 2116 in the second plane (meridional plane) (see FIG. 17). That is, the reflecting surface 21110 is formed so as to satisfy Fs<L<Fm.

Similarly to the fourth embodiment, the focal position of the secondary light source formed on the incidence surface 2109 can be adjusted by forming the reflecting surface 21110 so as to satisfy Rs<Rm. Similarly to the fourth embodiment, the eyepiece surface 2116 is formed so as to satisfy Rs<R<Rm.

In the image display apparatus according to the fifth embodiment having the above-mentioned configuration, it is possible to achieve a decrease in size of the at least one eyepiece optic 2102 and to use the illumination light with high efficiency.

As described above, the eyepiece prism 2115 in the fifth embodiment is restricted in size, and the transmission loss increases in the configuration in which the light source image is focused on a pupil and in the configuration in which the light source image is conjugate with the exit pupil of the at least one eyepiece optic 2102. Particularly, when any of the light source images in the first plane (sagittal plane) and the second plane (meridional plane) is focused in the inside separated from the eyepiece prism 2115 or in the outside separated from the eyepiece prism 2115, the transmission loss increases in any of the first plane and the second plane.

Therefore, as in the fifth embodiment, it is possible to reduce the transmission loss of illumination light by focusing the light source image inside the eyepiece prism 2115 in the first plane (sagittal plane) and focusing the light source image outside the eyepiece prism 2115 in the second plane (meridional plane). By reducing the transmission loss, it is possible to improve the use efficiency of illumination light.

According to the fifth embodiment, similarly to the fourth embodiment, since the aperture width of the eyepiece surface 2116 in the direction parallel or substantially parallel to the second plane in the second plane (meridional plane) is sufficient, it is possible to reduce a light flux of image light which is not incident on the pupil without increasing the transmission loss.

According to the fifth embodiment, similarly to the fourth embodiment, since the eyepiece surface 2116 satisfies Rs<R<Rm, it is possible to further improve the use efficiency of illumination light.

According to the fifth embodiment, similarly to the fourth embodiment, since the position in the illumination prism 21070 subjected to the diffusing surface treatment is separated from the display device 2108, it is possible to reduce an influence of the unevenness shape on the image light.

According to the fifth embodiment, similarly to the fourth embodiment, since the incidence surface 2109 subjected to the diffusing surface treatment is disposed to be closer to the light source 2106 than the reflecting surface 21110 having positive optical power, light diffused from the incidence surface 2109 subjected to the diffusing surface treatment can be used as a secondary light source. An enlarged light source image can be obtained by focusing the second light source by the use of the reflecting surface 21110.

According to the fifth embodiment, since the incidence surface 2109 is covered with the mask 2113, it is possible to reduce flare and ghost in the image light.

An image display apparatus according to a sixth embodiment of the present disclosure will be described below. The sixth embodiment is different from the fourth embodiment in the configuration of the reflecting surface in the illumination prism. Hereinafter, the sixth embodiment will be described. Constituents having the same functions and configurations as in the fourth embodiment will be referenced by the same reference numerals.

The sixth embodiment is equal to the fourth embodiment in the configurations and the functions of constituents other than the illumination prism.

Figure 18:
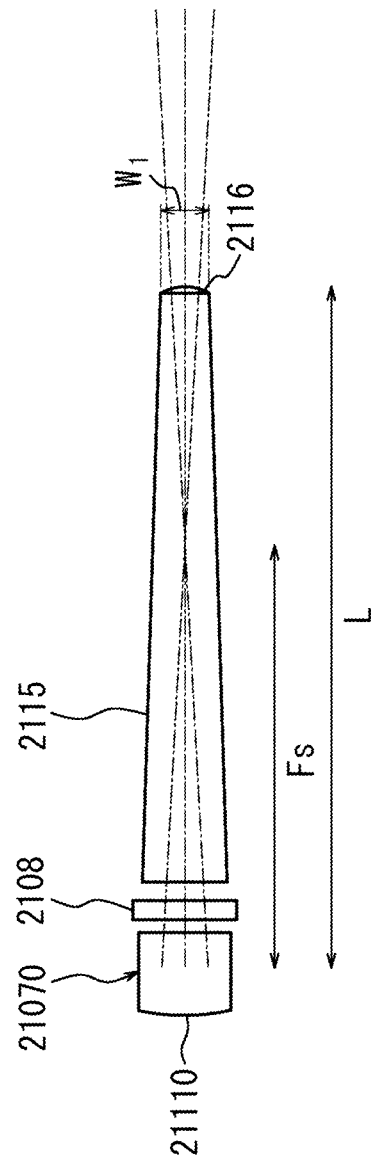
FIG. 18 is an optical path diagram illustrating a focal position of the light source image in the first plane in an image display apparatus according to a fifth embodiment.
Figure 19:
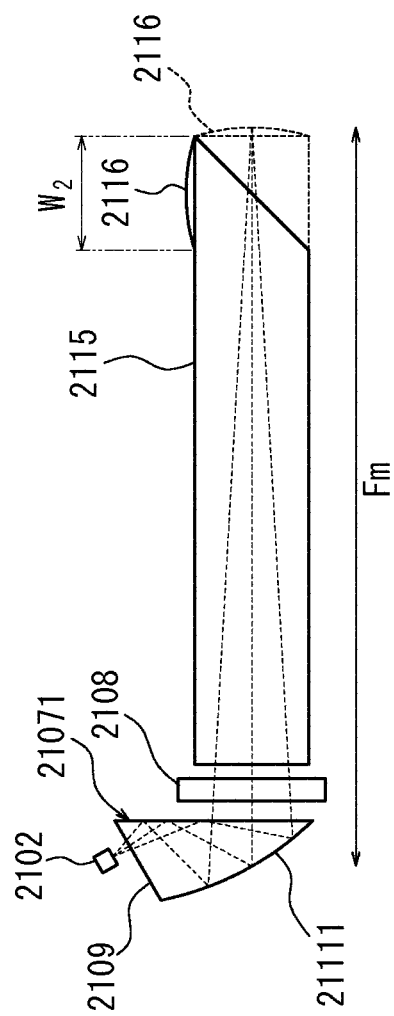
FIG. 19 is an optical path diagram illustrating a focal position of the light source image in the second plane in an image display apparatus according to a sixth embodiment.

In the sixth embodiment, a reflecting surface 21111 is formed so that an image of a secondary light source formed on the incidence surface is focused inside the eyepiece prism 2115 in the first plane (sagittal plane) (see FIG. 18). Unlike the fifth embodiment, the reflecting surface 21111 is formed so that the image of the secondary light source formed on the incidence surface is substantially focused on the eyepiece surface 2116 in the second plane (meridional plane) (see FIG. 19). The position on which the image of the light source is focused in the first plane may be set to the vicinity of the eyepiece surface 2116 so as to satisfy $L-Am(W_2)<Fm<L+Am(W_2)$.

In the image display apparatus according to the sixth embodiment having the above-mentioned configuration, it is possible to achieve a decrease in size of the at least one eyepiece optic 2102 and to use the illumination light with high efficiency.

It is preferable that the size of the eyepiece surface 2116 in the direction parallel or substantially parallel to the second plane (meridional plane) be large, from the viewpoint of alignment of an eye with the eyepiece surface 2116. However, an amount of light which is not incident on the eye may increase and the use efficiency of illumination light may be lowered. By fixing the display apparatus so as to be optimized for the eye position of an observer, alignment occurs even when the size of the eyepiece surface 2116 in the direction parallel or substantially parallel to the second plane is reduced. Therefore, when alignment occurs, it is possible to improve the use efficiency of illumination light by reducing unnecessary light which is not incident on the eye. As a result, it is possible to use illumination light with high efficiency by forming the reflecting surface 21111 so that the focal position in the meridional plane is set to the vicinity of the eyepiece surface 2116 as in this embodiment.

According to the sixth embodiment, similarly to the fourth embodiment, since the position in the illumination prism 21071 subjected to diffusing surface treatment is separated from the display device 2108, it is possible to reduce an influence of the unevenness shape on the image light.

According to the sixth embodiment, similarly to the fourth embodiment, since Rs<R<Rm is satisfied, it is possible to further improve the use efficiency of illumination light.

According to the sixth embodiment, similarly to the fourth embodiment, since the incidence surface 2109 subjected to the diffusing surface treatment is disposed to be closer to the light source 2106 than the reflecting surface 21111 having positive optical power, light diffused from the incidence surface 2109 subjected to the diffusing surface treatment can be used as a secondary light source. An enlarged light source image can be obtained by focusing the second light source by the use of the reflecting surface 21111.

According to the sixth embodiment, since the incidence surface 2109 is covered with the mask 2113, it is possible to reduce flare and ghost in the image light.

While the present disclosure has been described in conjunction with the drawings and the examples, it should be noted by those skilled in the art that various modifications and corrections can be easily made on the basis of this disclosure. Therefore, it should be noted that the modifications or corrections are included in the scope of the present disclosure.

For example, the eyepiece prism 115 is used for the at least one eyepiece optic 102 in the first to third embodiments, but the present disclosure is not limited to the eyepiece prism 115 and, for example, the at least one eyepiece optic may be constituted by one or more mirrors disposed at the same position as the fourth surface 120 of the eyepiece prism 115.

The first to third embodiments employ the configuration in which the incidence surface 109 of the illumination prism 107 is subjected to the surface treatment for diffusing light, but such treatment may not be performed and the incidence surface may be a flat plane or curved plane. Here, when the incidence surface is a flat plane, the same advantages as in the first to third embodiments can be obtained by focusing the image itself of the light source 106 on the above-mentioned position instead of the secondary light source formed on the incidence surface 109.

In the first to third embodiments, the at least one eyepiece optic 102 is formed to extend from the temple of the eyeglasses 104 to the front of an eye, but may be formed, for example, to extend from the top of the lens to the front of the eye or in any other configuration so that the at least one eyepiece optic 102 is within the field of view of a user's eye.

Figure 20:
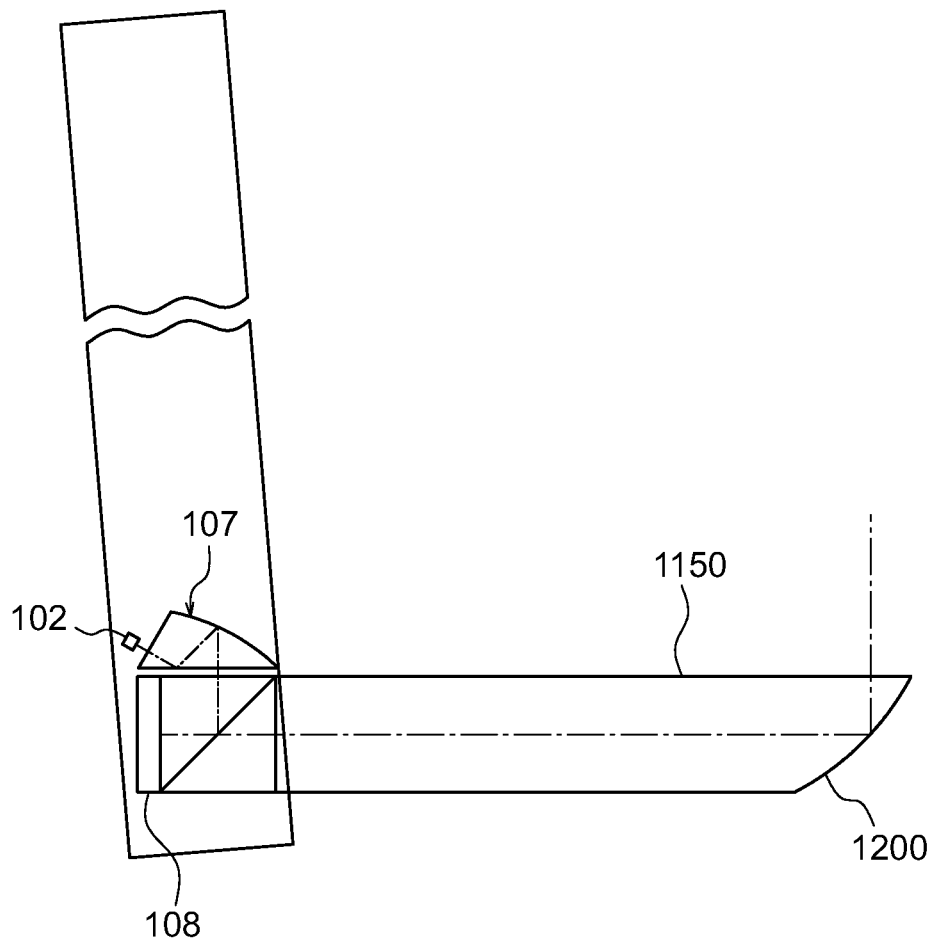
FIG. 20 is a cross-sectional view of the image display apparatus when a reflective LCD display device is used in the first to third embodiments.

In the first to third embodiments, the display device 108 is a transmissive LCD device, but may be a reflective LCD device (see FIG. 20). When a reflective display device is used, the second light source is guided to the reflective LCD device 108 using a half mirror or a polarization beam splitter. Similar advantages can be obtained by forming the fourth surface 1200 of the eyepiece prism 1150 as a reflecting surface having positive optical power without providing optical power to the eyepiece surface. Similar advantages can also be obtained by forming the third surface 119 of the eyepiece prism 1102 as a transmissive surface having positive optical power without providing optical power to the eyepiece surface. Similar advantages can also be obtained by forming the fourth surface 1200 of the eyepiece prism 1150 as a reflecting surface having positive optical power with providing optical power to the eyepiece surface.

The first and second embodiments employ the configuration in which the focal position of the secondary light source formed on the incidence surface 109 in the first plane is aligned to the eyepiece surface 116, but the secondary light source may be focused on the vicinity of the eyepiece surface 116.

In the first embodiment, (Fs+E) is substantially equal to Fm, but the present disclosure is not limited to this configuration. When Fs<Fm is satisfied, the secondary light source formed on the incidence surface 109 in the second plane can be approached to the vicinity of the eye.

For example, in the fourth to sixth embodiments, the reflecting faces 2111, 21110, and 21111 are formed so that the eyepiece surface 2116 is located in the vicinity of the focal position of the light source image in the first plane (sagittal plane), between the focal positions of the light source image in the first plane and the second plane (meridional plane), and in the vicinity of the focal position of the light source image in the second plane.

That is, with regard to the illumination prism 2107 in which the focal position in the first plane (sagittal plane) is closer to the display device 2108 than the focal position in the second plane (meridional plane), when the position of the eyepiece surface 2116 is located between the vicinity of the focal position in the first plane and the vicinity of the focal position in the second plane, it is possible to reduce vignetting in the eyepiece prism 115, similarly to the first to third embodiments.

In the fourth to sixth embodiments, the eyepiece prism 2115 is used for the at least one eyepiece optic 2102, but the present disclosure is not limited to the eyepiece prism 2115 and, for example, the at least one eyepiece optic may be constituted by one or more mirrors disposed at the same position as the fourth surface 2120 of the eyepiece prism 2115.

The fourth to sixth embodiments employ the configuration in which the incidence surface 2109 of the illumination prisms 2107, 21070, and 21071 is subjected to the surface treatment for diffusing light, but such treatment may not be performed and the incidence surface may be a flat plane. Here, when the incidence surface is a flat plane, the same advantages as in the fourth to sixth embodiments can be obtained by focusing the image itself of the light source 2106 on the above-mentioned position instead of the secondary light source formed on the incidence surface 2109.

In the fourth to six embodiments, the at least one eyepiece optic 2102 is formed to extend from the temple of the eyeglasses 2104 to the front of an eye, but may be formed, for example, to extend from the top of the lens to the front of the eye or in any other configuration so that the at least one eyepiece optic 102 is within the field of view of a user's eye.

Figure 21:
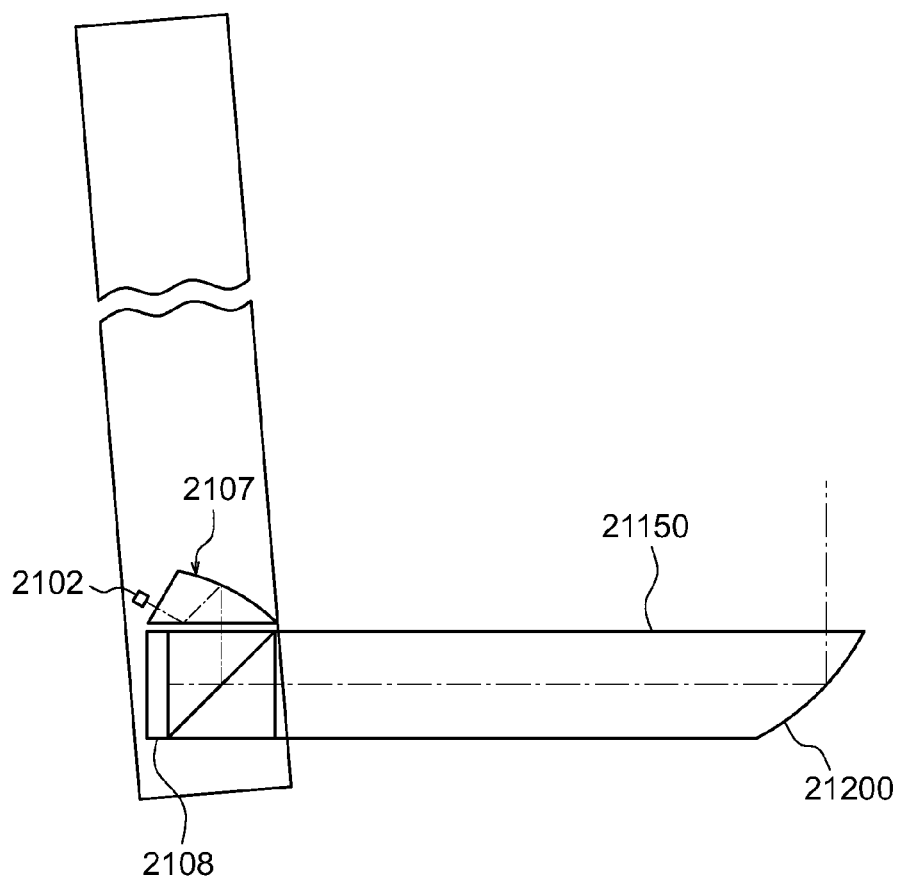
FIG. 21 is a cross-sectional view of the image display apparatus when a reflective LCD display device is used in the fourth to sixth embodiments.

In the fourth to sixth embodiments, the display device 2108 is a transmissive LCD device, but may be a reflective LCD device (see FIG. 21). When a reflective display device is used, the second light source is guided to the reflective LCD device 2108 using a half mirror or a polarization beam splitter. The same advantages can be obtained even by forming the fourth surface 21200 of the eyepiece prism 21150 as a reflecting surface having positive optical power without providing optical power to the eyepiece surface Similar advantages can also be obtained by forming the fourth surface 21200 of the eyepiece prism 21150 as a reflecting surface having positive optical power with providing optical power to the eyepiece surface.

100, 2100 image display apparatus
102, 2102 eyepiece optical system
106, 2106 light source
107, 2107, 21070, 21071 illumination prism
108, 2108 display device
109, 2109 incidence surface
111, 1110, 1111, 2111, 21110, 21111 reflecting surface
115, 1150, 2115, 21150 eyepiece prism
116, 2116 eyepiece surface
120, 1200, 2120, 21200 the fourth surface
CR central ray

What is claimed is:
1. An image display apparatus comprising:
a light source that emits illumination light;
a display device that modulates the illumination light and emits the modulated light as image light;
at least one illumination optic that transmits the illumination light emitted from the light source to the display device and that has an optical surface having positive optical power; and
at least one eyepiece optic that transmits the image light from the display device and that has an eyepiece surface transmitting the transmitted image light,
wherein the at least one illumination optic focuses an image of the light source on one of the eyepiece surface and the vicinity of the eyepiece surface in a first plane, the first plane comprising a central ray of the image light emitted from the display device.
2. The image display apparatus according to claim 1, wherein the first plane is one of a sagittal plane of the at least one illumination optic and a meridional plane of the at least one illumination optic.
3. The image display apparatus according to claim 2, wherein the at least one illumination optic is an illumination prism that has an illumination incidence surface on which the illumination light emitted from the light source is incident, an illumination emission surface which emits the illumination light, and a concave reflecting surface which reflects the illumination light incident from the illumination incidence surface to the illumination emission surface,
wherein the concave reflecting surface is a curved surface having different radii of curvature in the sagittal plane and the meridional plane, and wherein the concave reflecting surface is the optical surface having positive optical power.
4. The image display apparatus according to claim 3, wherein, when the radius of curvature of a cross-sectional surface taken along the sagittal plane in the concave reflecting surface is Rs, and the radius of curvature of a cross-sectional surface taken along the meridional plane is Rm, Rs<Rm is satisfied.
5. The image display apparatus according to claim 4, wherein, when the eyepiece surface is a curved surface having a radius of curvature of R, Rs<R<Rm is satisfied.
6. The image display apparatus according to claim 2, wherein, when a sagittal focal distance of the at least one illumination optic with the light source as an object point is defined as Fs, and a meridional focal distance of the at least one illumination optic with the light source as the object point is defined as Fm, Fs=Fm is satisfied.
7. The image display apparatus according to claim 2, wherein, when a sagittal focal distance of the at least one illumination optic with the light source as an object point is defined as Fs, and a meridional focal distance of the at least one illumination optic with the light source as the object point is defined as Fm, Fm=Fs is satisfied.
8. The image display apparatus according to claim 3, wherein, when a sagittal focal distance of the at least one illumination optic with the light source as an object point is defined as Fs, an optical-axis optical path length from the concave reflecting surface of the at least one illumination optic to the eyepiece surface is defined as L, and an aperture size of the eyepiece surface in a direction parallel to the meridional plane is defined as Am, L−Am<Fs<L+Am is satisfied.
9. The image display apparatus according to claim 3, wherein the illumination incidence surface of the illumination prism is subjected to a surface treatment for diffusing light.
10. The image display apparatus according to claim 9, wherein the illumination incidence surface comprises a light-blocking mask that has an opening portion transmitting the illumination light and a light-blocking portion blocking the illumination light.

11. The image display apparatus according to claim 10,
wherein the light-blocking mask has a larger aperture size in a direction parallel to the meridional plane as compared to a direction perpendicular to the meridional plane.

12. The image display apparatus according to claim 3,
wherein an image of the illumination light formed on a diffusing surface formed on the illumination incidence surface is used as a secondary light source and the illumination prism focuses the secondary light source instead of the light source.

13. The image display apparatus according to claim 1,
wherein the at least one eyepiece optic is an eyepiece prism comprising an image incidence surface on which the image light from the display device is incident, a reflecting surface which reflects the image light therein at least once, and the eyepiece surface which transmits the image light to an eye.

14. The image display apparatus according to claim 13,
wherein an aperture width ($W_1$) of the eyepiece surface in a direction perpendicular to a meridional plane of the at least one illumination optic is smaller than an aperture width ($W_2$) of the eyepiece surface in a direction parallel to the meridional plane.

15. The image display apparatus according to claim 13,
wherein an aperture width ($W_1$) of the eyepiece surface of the eyepiece prism in a direction perpendicular to a meridional plane of the at least one illumination optic is smaller than an aperture width ($W_2$) of the image incidence surface of the eyepiece prism in a direction perpendicular to the meridional plane.

16. The image display apparatus according to claim 1,
wherein each of the at least one illumination optic is selected from a group consisting of an eccentric illumination optic, a rotationally asymmetric optic about an optical axis, and an eccentric illumination optic that is rotationally asymmetric optic about the optical axis.

17. An image display apparatus comprising:
a light source that emits illumination light;
a display device that modulates the illumination light and transmits the modulated light as image light;
at least one illumination optic that transmits the illumination light emitted from the light source to the display device and that has positive optical power; and
at least one eyepiece optic that transmits the image light from the display device and that has an eyepiece surface transmitting the transmitted image light to outside of the at least one eyepiece optic,
wherein the at least one illumination optic:
focuses the transmitted image light on the outside of the at least one eyepiece optic in a first plane, the first plane comprising a central ray of the image light transmitted from the display device, and
focuses the transmitted image light between the display device and the eyepiece surface in a second plane, the second plane different from the first plane and the second plane comprising the central ray.

18. The image display apparatus according to claim 17,
wherein a width ($W_1$) of the eyepiece surface along a first direction is smaller than a width ($W_2$) along a second direction perpendicular to the first direction,
wherein the first plane is a sagittal plane of the at least one illumination optic with the light source as an object point and the second plane is a meridional plane of the at least one illumination optic with the light source as the object point,
wherein the at least one illumination optic is an illumination prism that has an illumination incidence surface on which the illumination light emitted from the light source is incident, an illumination emission surface which emits the illumination light, and a concave reflecting surface which reflects the illumination light incident from the illumination incidence surface to the illumination emission surface, and
wherein, when a sagittal focal distance of the concave reflecting surface in the sagittal plane with the light source as an object point is defined as Fs, a meridional focal distance of the concave reflecting surface in the meridional plane with the light source as the object point is defined as Fm, and an optical-axis optical path length from the concave reflecting surface of the illumination prism to the eyepiece surface is defined as L, Fm<L<Fs is satisfied.

19. The image display apparatus according to claim 17,
wherein each of the at least one illumination optic is selected from a group consisting of an eccentric illumination optic, a rotationally asymmetric optic about an optical axis, and an eccentric illumination optic that is rotationally asymmetric optic about the optical axis.

20. An image display apparatus comprising:
a first light source that emits illumination light;
a display device that modulates the illumination light and transmits the modulated light as image light;
at least one illumination optic that transmits the illumination light emitted from the first light source to the display device and that has positive optical power; and
at least one eyepiece optic that transmits the image light from the display device and that has an eyepiece surface transmitting the transmitted image light,
wherein a sagittal focal position which is a focal position of the at least one illumination optic in a sagittal plane with the first light source as an object point is located closer to the display device than a meridional focal position which is a focal position in a meridional plane.

21. The image display apparatus according to claim 20,
wherein the at least one illumination optic is an illumination prism that has an incidence surface on which the illumination light emitted from the first light source is incident and a concave reflecting surface which reflects the illumination light to an emission surface thereof, and
wherein the concave reflecting surface is a curved surface having different radii of curvature in the sagittal plane and the meridional plane.

22. The image display apparatus according to claim 21,
wherein, when a sagittal focal distance of the at least one illumination optic with the first light source as the object point is defined as Fs, a meridional focal distance of the at least one illumination optic with the first light source as the object point is defined as Fm, an optical-axis optical path length from the concave reflecting surface of the at least one illumination optic to the eyepiece surface is defined as L, and an aperture size of the eyepiece surface in a direction parallel to the meridional plane is defined as Am, the relationships Fs<L+Am and L−Am<Fm are satisfied.

23. The image display apparatus according to claim 22,
wherein L−Am<Fs<L+Am is satisfied.

24. The image display apparatus according to claim 22,
wherein a width ($W_1$) of the eyepiece surface along a first direction is smaller than a width ($W_2$) along a second direction perpendicular to the first direction, and
wherein the sagittal plane is parallel to the first direction.

25. The image display apparatus according to claim 24, wherein Fs<L<Fm.

26. The image display apparatus according to claim 24, wherein, when a distance from the eyepiece surface to an eye is E, L+E=Fm is satisfied.

27. The image display apparatus according to claim 21, wherein, when the radius of curvature of a cross-sectional surface taken along the sagittal plane in the concave reflecting surface is defined as Rs, and the radius of curvature of a cross-sectional surface taken along the meridional plane in the concave reflecting surface is defined as Rm, Rs<Rm is satisfied.

28. The image display apparatus according to claim 27, wherein, when a radius of curvature of the eyepiece surface is R, Rs<R<Rm is satisfied.

29. The image display apparatus according to claim 21, wherein the incidence surface of the illumination prism is subjected to a surface treatment for diffusing light.

30. The image display apparatus according to claim 29, wherein the incidence surface is provided with a light-blocking mask that has an opening portion transmitting the illumination light and a light-blocking portion blocking the illumination light.

31. The image display apparatus according to claim 30, wherein the light-blocking mask has a large aperture size in a direction parallel to the meridional plane.

32. The image display apparatus according to claim 29, wherein the illumination light formed on a diffusing surface formed on the illumination incidence surface is a second light source and the illumination prism focuses the second light source on the outside of the at least one eyepiece optic in a first plane, the first plane comprising a central ray of the image light transmitted from the display device, and focuses the image light between the display device and the eyepiece surface in a second plane, the second plane being different from the first plane and the second plane comprising the central ray,
wherein the focus of the second light source in the first plane and second plane is different than the focus of the first light source in the first plane and second plane.

33. The image display apparatus according to claim 20, wherein the at least one eyepiece optic is an eyepiece prism that has an image incidence surface on which the image light from the display device is incident, a reflecting surface which reflects the image light therein at least once, and the eyepiece surface which transmits the image light to an eye.

34. The image display apparatus according to claim 33, wherein an aperture width ($W_1$) of the eyepiece surface in a direction perpendicular to the meridional plane is smaller than an aperture width ($W_2$) of the eyepiece surface in a direction parallel to the meridional plane.

35. The image display apparatus according to claim 33, wherein an aperture width ($W_1$) of the eyepiece surface of the eyepiece prism in a direction perpendicular to the meridional plane is smaller than an aperture width ($W_2$) of the image incidence surface of the eyepiece prism in a direction perpendicular to the meridional plane.

36. The image display apparatus according to claim 20, wherein each of the at least one illumination optic is selected from a group consisting of an eccentric illumination optic, a rotationally asymmetric optic about an optical axis, and an eccentric illumination optic that is rotationally asymmetric optic about the optical axis.

* * * * *